US012777989B2

(12) United States Patent
Takahashi et al.

(10) Patent No.: US 12,777,989 B2
(45) Date of Patent: Nov. 3, 2026

(54) ROUTE GENERATION METHOD, ROUTE GENERATION SYSTEM, AND ROUTE GENERATION PROGRAM

(71) Applicant: Yanmar Holdings Co., Ltd., Osaka (JP)

(72) Inventors: Mamoru Takahashi, Osaka (JP); Yasuto Nishii, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 381 days.

(21) Appl. No.: 18/103,484

(22) Filed: Jan. 30, 2023

(65) Prior Publication Data

US 2023/0255129 A1 Aug. 17, 2023

(30) Foreign Application Priority Data

Feb. 15, 2022 (JP) ................................ 2022-021106

(51) Int. Cl.
*A01B 69/04* (2006.01)
*G05D 1/00* (2024.01)

(52) U.S. Cl.
CPC ......... *A01B 69/008* (2013.01); *G05D 1/0219* (2013.01)

(58) Field of Classification Search
None
See application file for complete search history.

(56) References Cited

U.S. PATENT DOCUMENTS 10,266,201 B2 4/2019 Dang et al.
11,814,074 B2 * 11/2023 Kakkar ............. B60W 60/0025
2018/0373256 A1 12/2018 Runde et al.
2019/0146513 A1 * 5/2019 Tomita ................. A01B 69/008 701/50
2019/0261566 A1 * 8/2019 Robertson ................. G06T 7/50
2020/0216086 A1 * 7/2020 Lenke ................... B60W 30/18

FOREIGN PATENT DOCUMENTS

CN 112868367 A 6/2021
JP 2018117558 A 8/2018
JP 2020113325 A 7/2020
JP 2021083391 A 6/2021

* cited by examiner

*Primary Examiner* — Lail A Kleinman
(74) *Attorney, Agent, or Firm* — Chris Mizumoto

(57) ABSTRACT

A generation processing section generates an inner work route on which a work vehicle is caused to travel in an inner region of a field and a headland work route on which the work vehicle is caused to travel in a headland region around the inner region of the field. A decision processing section decides a turning mode of a turning route on which the work vehicle is caused to turn and travel in the headland region on the basis of an operator's selection operation. A generation processing section generates the turning route for the turning mode decided on the basis of the operator's selection operation in the headland region.

11 Claims, 16 Drawing Sheets

ROUTE GENERATION METHOD, ROUTE GENERATION SYSTEM, AND ROUTE GENERATION PROGRAM

CROSS-REFERENCE

This application claims foreign priority of JP2022-021106 filed Feb. 15, 2022 and the disclosures of which are hereby incorporated by reference in their entirety.

TECHNICAL FIELD

The present invention relates to a route generation method for generating a target route on which a work vehicle is caused to travel automatically.

BACKGROUND ART

In recent years, advances in automation technology for agricultural machinery have led to introduction of work vehicles that perform work while traveling automatically in a field. In a case where a work vehicle is caused to travel automatically over the entire field, it is necessary to generate a target route for each one of an inner region of the field and a headland region around the inner region. Conventionally, there is a known technology for generating in a field a target route that includes a traveling route on which a work vehicle is caused to travel back and forth in the inner region and a traveling route on which the work vehicle is caused to circulate around the headland region (refer to, for example, Patent Document 1).

PRIOR ART DOCUMENT

Patent Document

Patent Document 1: Japanese Unexamined Patent Application Publication No. 2018-117558

SUMMARY OF INVENTION

Technical Problem

Incidentally, a turning mode of a work vehicle in a headland region includes a first turning mode for turning by traveling forward, turning backward and traveling forward (refer to FIG. 4A to FIG. 4E), and a second mode for turning by traveling forward, traveling backward, turning forward, traveling backward and traveling forward (refer to FIG. 5A to FIG. 5E). In a case of the first turning mode, while the work vehicle can turn without stepping into a region which has been worked (worked region), a region required for the work vehicle turning (turning region) increases. In contrast, in a case of the second turning mode, while the turning region can be reduced, the work vehicle steps into the worked region upon turning. Thus, there are an advantage and a disadvantage on each one of the turning modes.

In conventional technology, a target route is generated by setting a turning route of each turning portion in a headland region to either a turning route for the first turning mode (first turning route) or a turning route for the second turning mode (second turning route) in accordance with a size of the headland region. For example, the first turning route is generated in a region near the inner region of the headland region and the second turning route is generated in a region near a boundary of a field of the headland region (for example, outermost peripheral region). In this case, when a work vehicle travels on the target route, the work vehicle can work by automatic traveling to the vicinity of the boundary of the field, and, however, steps into worked region in the outermost peripheral region. It cannot be said that the target route is appropriate for a user who wants to avoid stepping into worked region when the work vehicle turns and travels.

Thus, it is difficult to generate a target route including a turning route that meets user's demand using conventional technology.

An object of the present invention is to provide a route generation method, a route generation system, and a route generation program that can generate a target route including a turning route that meets user's demand.

Solution to Problem

A route generation method according to the present invention performs generating an inner work route on which a work vehicle is caused to travel in an inner region of a field, generating a headland work route on which the work vehicle is caused to travel in a headland region around the inner region in the field, deciding a turning mode of a turning route on which the work vehicle is caused to turn and travel in the headland region on the basis of a user's selection operation, and generating the turning route for the turning mode decided on the basis of the user's selection operation in the headland region.

A route generation system according to the present invention includes a first generation processing section, a second generation processing section, a decision processing section, and a third generation processing section. The first generation processing section generates an inner work route on which a work vehicle is caused to travel in an inner region of a field. The second generation processing section generates a headland work route on which the work vehicle is caused to travel in a headland region around the inner region of the field. The decision processing section decides a turning mode of a turning route on which the work vehicle is caused to turn and travel in the headland region on the basis of a user's selection operation. The third generation processing section generates the turning route for the turning mode decided on the basis of the user's selection operation in the headland region.

A route generation program according to the present invention is a program that causes one or a plurality of processors to perform generating an inner work route on which a work vehicle is caused to travel in an inner region of a field, generating a headland work route on which the work vehicle is caused to travel in a headland region around the inner region in the field, deciding a turning mode of a turning route on which the work vehicle is caused to turn and travel in the headland region on the basis of a user's selection operation, and generating the turning route for the turning mode decided on the basis of the user's selection operation in the headland region.

Advantageous Effects of Invention

The present invention can provide a route generation method, a route generation system, and a route generation program that can generate a target route including a turning route that meets user's demand.

DESCRIPTION OF EMBODIMENTS

The following embodiments are examples of embodying the present invention, and are not intended to limit a technical scope of the present invention.

Figure 1:
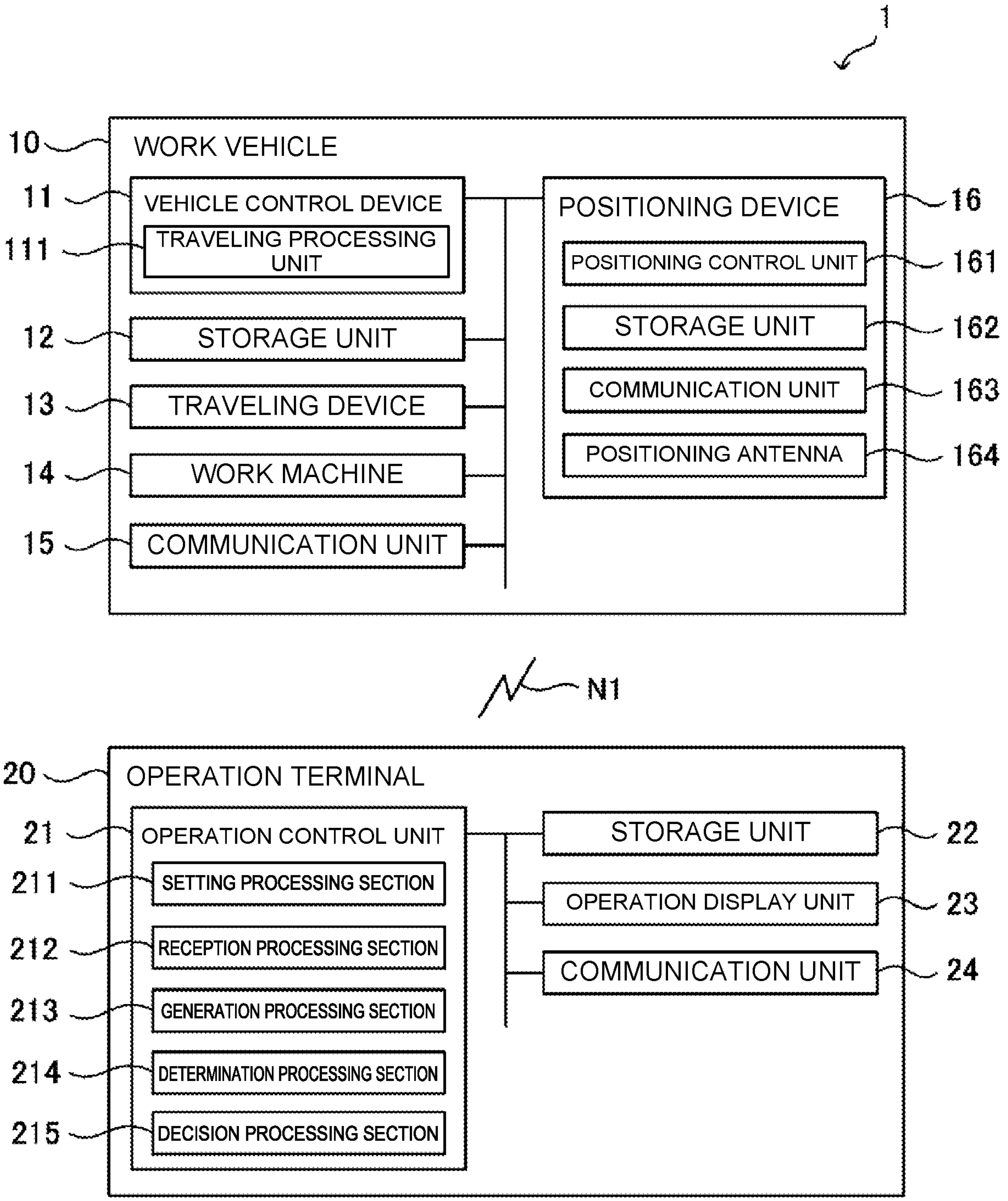
FIG. 1 is a block diagram illustrating a configuration of an automatic traveling system according to an embodiment of the present invention.

As illustrated in FIG. 1, an automatic traveling system 1 according to an embodiment of the present invention includes a work vehicle 10 and an operation terminal 20. The work vehicle and the operation terminal 20 can communicate with each other via a communication network N1. For example, the work vehicle 10 and the operation terminal 20 can communicate with each other via a portable telephone line network, a packet line network, or a wireless LAN.

In the present embodiment, a case where the work vehicle 10 is a tractor will be described as an example. It is noted that as another embodiment, the work vehicle 10 may be a rice transplanter, a combine harvester, a construction machine, a snow removing vehicle, or the like. The work vehicle 10 is a so-called robot tractor provided with a configuration capable of traveling automatically (autonomous travel) in a pre-registered field F (refer to FIG. 3). For example, an operator registers a target field F and sets a target route R to a field F on which the work vehicle 10 is caused to travel automatically. On the basis of the work vehicle 10's current position information calculated by a positioning device 16, the work vehicle 10 travel automatically in accordance with the target route R which has been pre-set to the field F. In addition, the work vehicle 10 can also perform predetermined work while traveling automatically in a field. The field F includes an inner region Fa which is an inside region thereof and a headland region Fb which is a region around the inner region Fa. In the inner region Fa, there is set an inner work route Ra that is a traveling route for the work vehicle 10, and in the headland region Fb, there is set a headland work route Rb that is a traveling route for the work vehicle 10. Further, in the headland region Fb, there are set turning routes (first turning route Rb1 and second turning route Rb2 that will be described later) on which the work vehicle 10 turns and travels.

Figure 3:
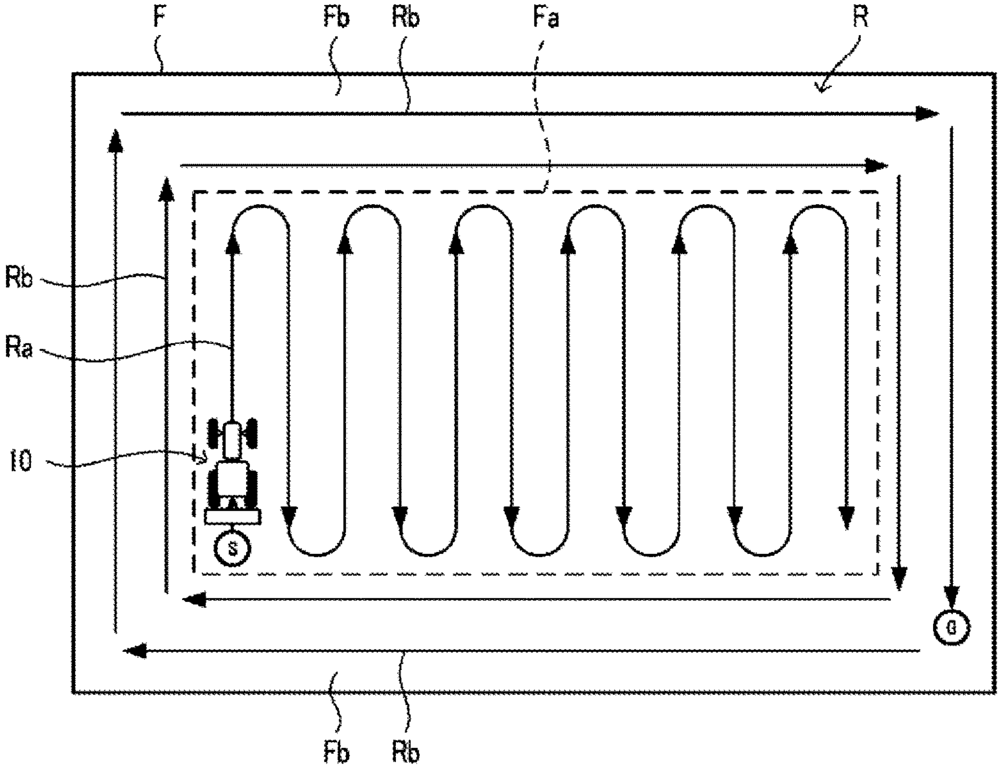
FIG. 3 is a diagram illustrating one example of a field and a target route according to an embodiment of the present invention.

For example, in the field F shown in FIG. 3, the work vehicle 10 performs a predetermined work in the inner region Fa while traveling back and forth in parallel on the inner work route Ra from a work starting position S, and performs the predetermined work in the headland region Fb while circulating and traveling on the headland work route Rb in a spiral form toward a work ending position G. The target route R is not limited to the route shown in FIG. 3, but can be set as appropriate in accordance with work content. Additionally, although FIG. 3 illustrates a route on which the work vehicle 10 initially travels in the inner region Fa, and then travels in the headland region Fb, an order in which the work vehicle 10 travels is not limited to this. For example, the work vehicle 10 may initially travel in the headland region Fb, and then travel in the inner region Fa.

Incidentally, a turning mode of the work vehicle 10 in the headland region Fb includes a first turning mode for turning by traveling forward, turning backward and traveling forward (refer to FIG. 4A to FIG. 4E), and a second mode for turning by traveling forward, traveling backward, turning forward, traveling backward and traveling forward (refer to FIG. 5A to FIG. 5E).

A specific turning method with regard to the first turning mode of the work vehicle 10 will be described with reference to FIG. 4A to FIG. 4E. In FIG. 4A to FIG. 4E, a sign B1 indicates a worked region where the work vehicle 10 has traveled and performed work, and a sign Pa indicates a current position of the work vehicle 10. Here, the work vehicle 10 is assumed to perform cultivation work with a work machine 14 (refer to FIG. 2).

Figure 4A:
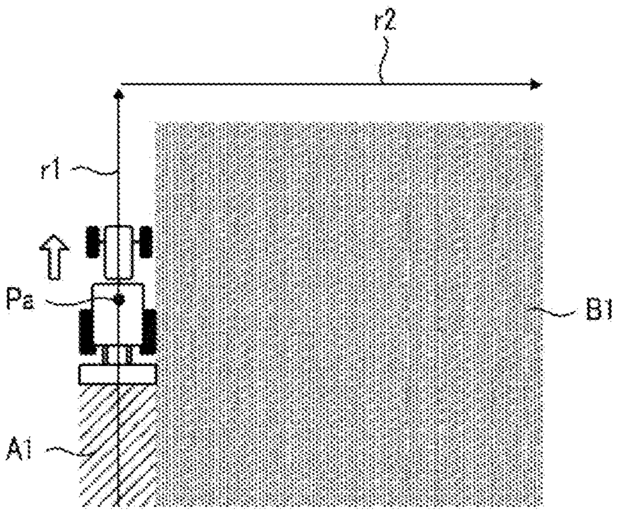
FIG. 4A is a diagram illustrating one example of a turning method with regard to a first turning mode of a work vehicle according to an embodiment of the present invention.
Figure 4B:
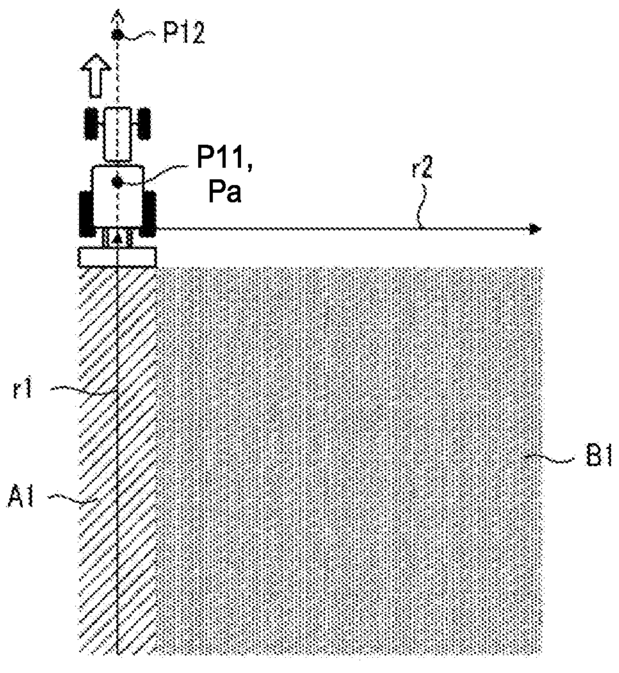
FIG. 4B is a diagram illustrating one example of a turning method with regard to a first turning mode of a work vehicle according to an embodiment of the present invention.
Figure 4C:
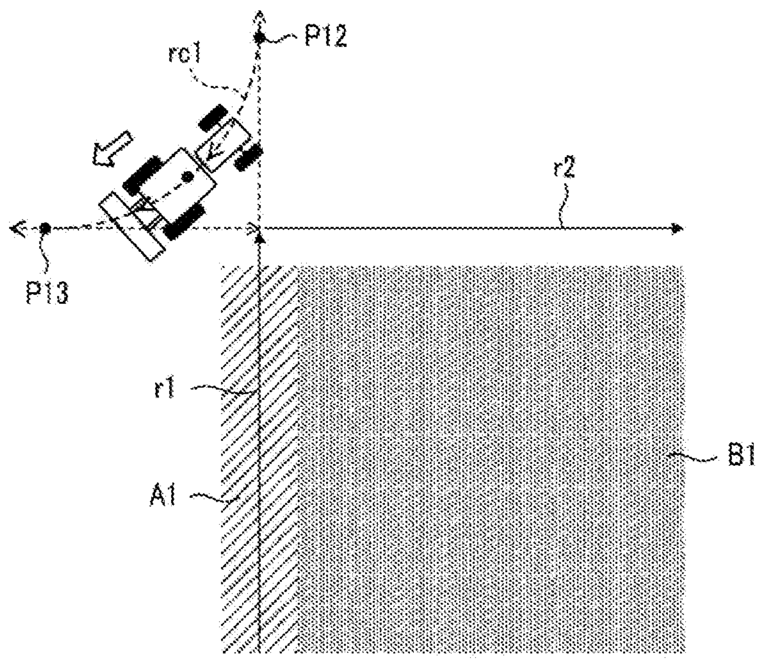
FIG. 4C is a diagram illustrating one example of a turning method with regard to a first turning mode of a work vehicle according to an embodiment of the present invention.

In FIG. 4A, the work vehicle 10 is performing cultivation work while traveling straight in a forward direction on a headland work route r1. A sign A1 indicates a worked region of the headland work route r1. As shown in FIG. 4B, when the work vehicle 10 reaches a predetermined position P11, it raises the work machine 14 to stop the cultivation work and travels straight to a predetermined position P12 on an extending line of the headland work route r1. When the work vehicle 10 reaches the predetermined position P12, it turns and travels in a backward direction on a backward turning route rc1 to a predetermined position P13 on an extending line of a headland work route r2, as shown in FIG. 4C.

Figure 4D:
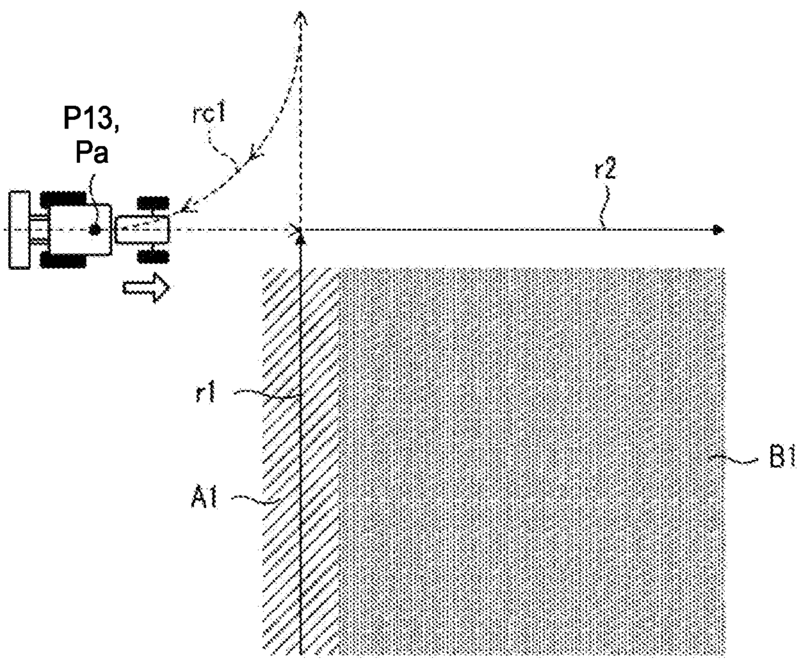
FIG. 4D is a diagram illustrating one example of a turning method with regard to a first turning mode of a work vehicle according to an embodiment of the present invention.
Figure 4E:
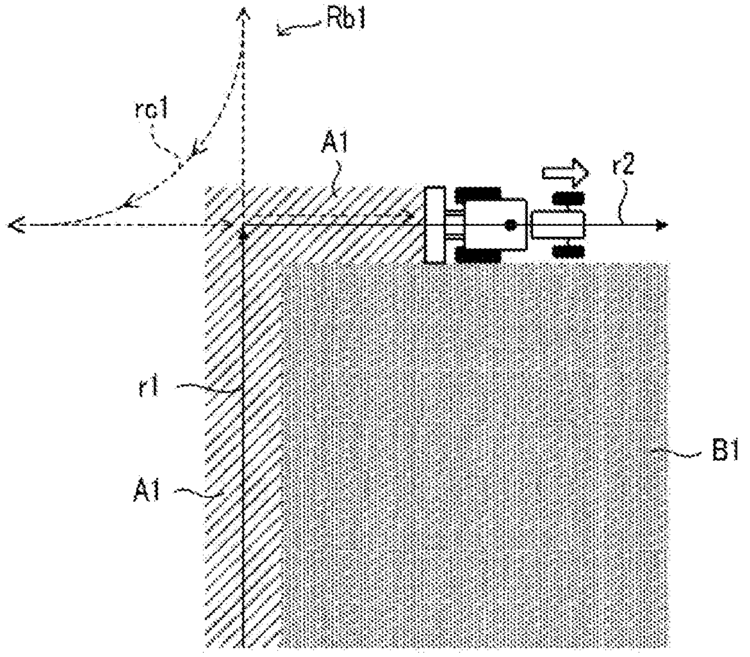
FIG. 4E is a diagram illustrating one example of a turning method with regard to a first turning mode of a work vehicle according to an embodiment of the present invention.

When the work vehicle 10 reaches the predetermined position P13, it travels straight in the forward direction toward the headland work route r2, as shown in FIG. 4D. Then, the work vehicle 10 lowers the work machine 14 at a predetermined position and resumes the cultivation work on the headland work route r2, as shown in FIG. 4E.

Thus, in the first turning mode, the work vehicle 10 travels and turns on the first turning route Rb1 (refer to FIG. 4E) includes a traveling route for traveling forward, turning backward, and traveling forward. In the first turning mode, the work vehicle 10 has an advantage of being capable of turning and traveling without stepping into the worked region B1. However, in a case of the first turning mode, there is a disadvantage that a region required for the work vehicle 10 turning (turning region) increases.

Next, a specific turning method with regard to the second turning mode of the work vehicle 10 will be described with reference to FIG. 5A to FIG. 5E.

Figure 5A:
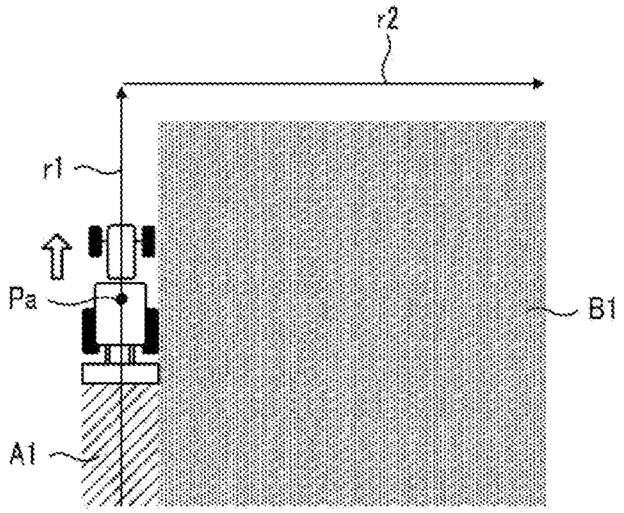
FIG. 5A is a diagram illustrating one example of a turning method with regard to a second turning mode of a work vehicle according to an embodiment of the present invention.
Figure 5B:
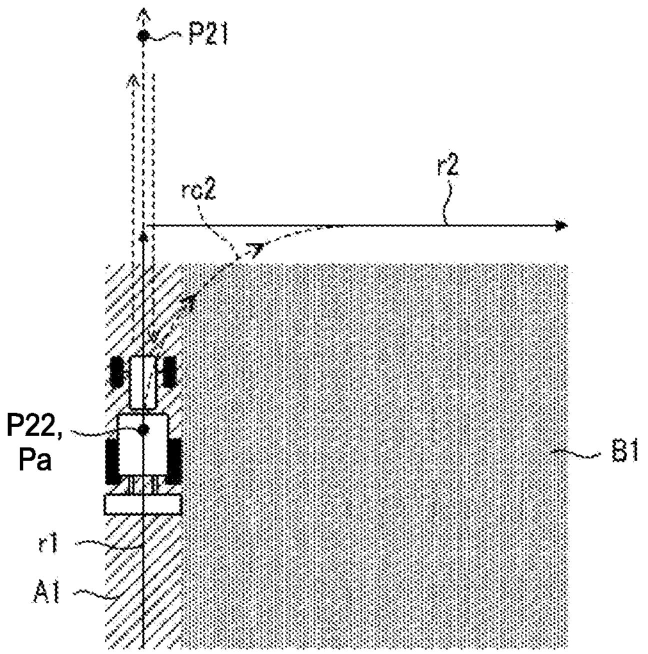
FIG. 5B is a diagram illustrating one example of a turning method with regard to a second turning mode of a work vehicle according to an embodiment of the present invention.

In FIG. 5A, the work vehicle 10 is performing cultivation work while traveling straight in a forward direction on a headland work route r1. As shown in FIG. 5B, when the work vehicle 10 reaches a predetermined position, it raises the work machine 14 to stop the cultivation work and travels straight to a predetermined position P21 on an extending line of the headland work route r1. When the work vehicle 10 reaches the predetermined position P21, it travels straight in a backward direction to a predetermined position P22 on the headland work route r1, as shown in FIG. 5B.

Figure 5C:
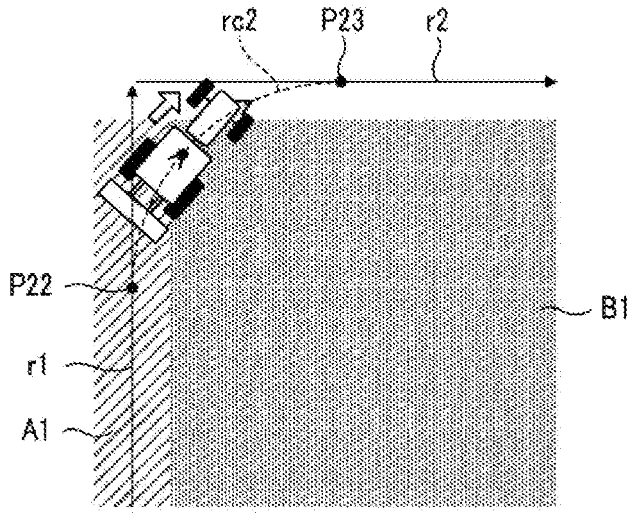
FIG. 5C is a diagram illustrating one example of a turning method with regard to a second turning mode of a work vehicle according to an embodiment of the present invention.
Figure 5D:
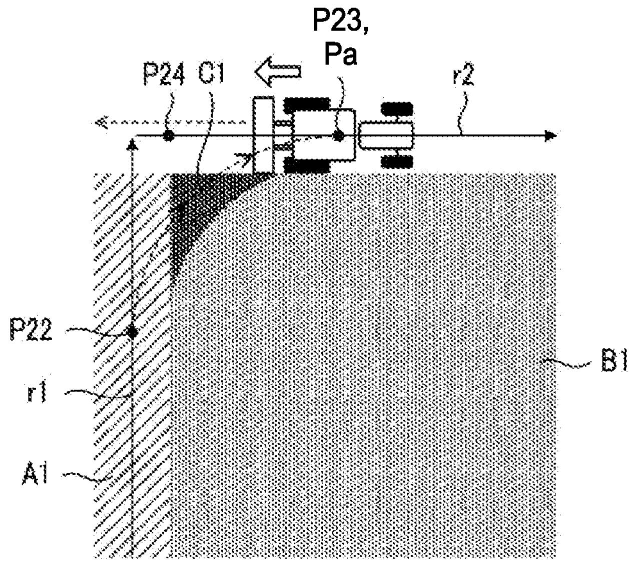
FIG. 5D is a diagram illustrating one example of a turning method with regard to a second turning mode of a work vehicle according to an embodiment of the present invention.
Figure 5E:
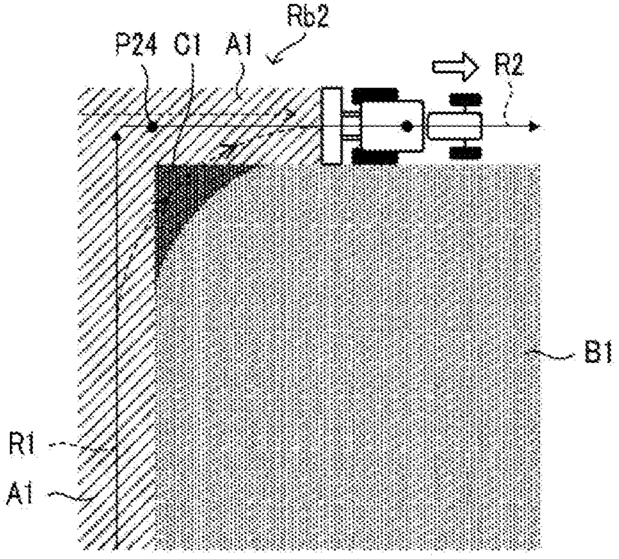
FIG. 5E is a diagram illustrating one example of a turning method with regard to a second turning mode of a work vehicle according to an embodiment of the present invention.

When the work vehicle 10 reaches the predetermined position P22, it turns and travels in a forward direction on a forward turning route rc2 to a predetermined position P23 on a headland work route r2, as shown in FIG. 5C. When the work vehicle 10 reaches the predetermined position P23, it travels straight in a backward direction to a predetermined position P24 on the headland work route r2, as shown in FIG. 5D. When the work vehicle 10 reaches the predetermined position P24, it lowers the work machine 14 at the predetermined position P24 and switches to forward traveling to resume cultivation work on the headland work route r2, as shown in FIG. 5E.

Thus, in the second turning mode, the work vehicle 10 travels and turns on a second turning route Rb2 (refer to FIG. 5E) includes a traveling route for traveling forward, traveling backward, turning forward, traveling backward, and traveling forward. The second turning mode has an advantage that a region required for the work vehicle 10 turning (turning region) can be reduced. However, in a case of the second turning mode, there is a disadvantage that the work vehicle 10 steps into a worked region B1 upon turning. A sign C1 indicates a region of the worked region B1 (stepping region C1) into which the work vehicle 10 stepped upon turning and traveling.

The stepping region C1 becomes trampled in the worked region B1 (already cultivated land) and remains trampled even at a point of time when the work in the field F is completed. In this case, an operator will work again by manual traveling after the end of automatic traveling on the region (stepping region C1) that was trampled, but since a periphery of the stepping region C1 is surrounded by the worked region B1, not only the stepping region C1 but also a peripheral region thereof has to be worked again. This also causes a problem of work efficiency being reduced in the entire field F.

Thus, there are an advantage and a disadvantage on the first and the second turning modes, respectively. Since conventional technology may generate a target route including a turning route for a disadvantageous turning mode that a user can not anticipate, it is difficult to generate a target route including a turning route that meets user's demand. In contrast, the automatic traveling system 1 according to the present embodiments, as shown below, can generate a target route including a turning route that meets user's demand.

[Work Vehicle 10]

Figure 2:
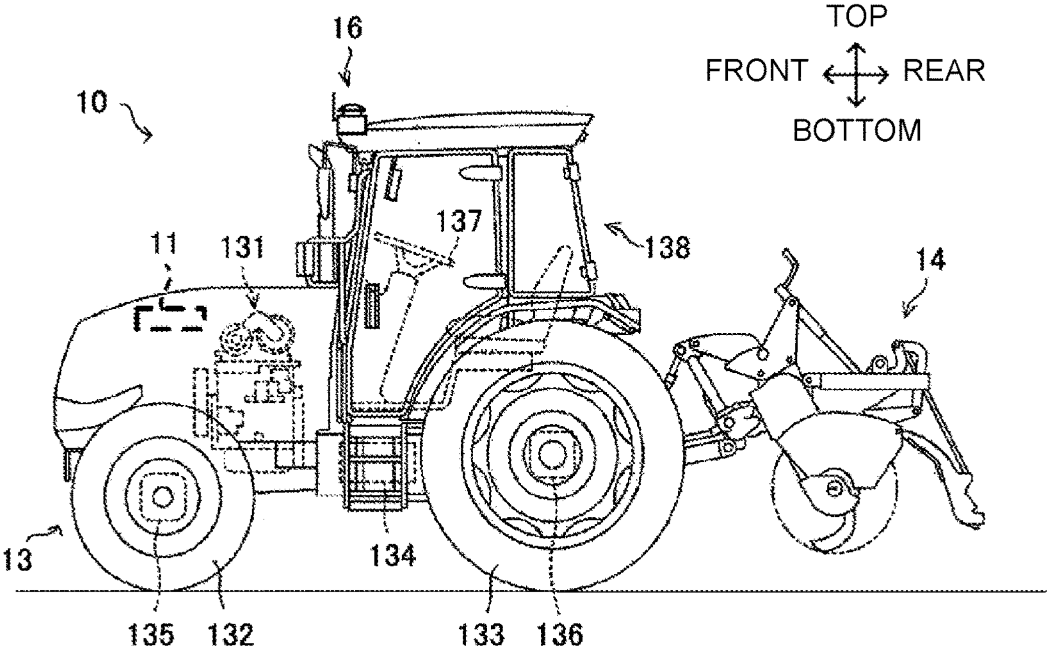
FIG. 2 is an external diagram illustrating one example of a work vehicle according to an embodiment of the present invention.

As shown in FIG. 1 and FIG. 2, the work vehicle 10 has a vehicle control device 11, a storage unit 12, a traveling device 13, a work machine 14, a communication unit 15, a positioning device 16, and the like. The vehicle control device 11 is electrically connected to the storage unit 12, the traveling device 13, the work machine 14, the positioning device 16, and the like. It is noted that the vehicle control device 11 and the positioning device 16 may be capable of executing a wireless communication.

The communication unit 15 is a communication interface for connecting the work vehicle 10 to the communication network N1 by wire or wireless means and for executing, via the communication network N1, data communication with external apparatus such as an operation terminal 20 in accordance with a predetermined communication protocol. The work vehicle 10 can communicate wirelessly with the operation terminal 20 via the communication unit 15.

The storage unit 12 is a non-volatile storage unit such as a HDD (Hard Disk Drive) or a SSD (Solid State Drive) that stores various types of information. The storage unit 12 stores control programs such as an automatic traveling program for causing the vehicle control device 11 to perform automatic traveling processing. For example, the automatic traveling program is recorded in a computer-readable recording medium such as a flash ROM, an EEPROM, a CD, or a DVD in a non-transitory manner, and is read by a predetermined reading device (not illustrated) to be stored in the storage unit 12. It is noted that the automatic traveling program may be downloaded from a server (not illustrated) to the work vehicle 10 via the communication network N1 to be stored in the storage unit 12. Additionally, the storage unit 12 may store route data of a target route R which is generated in the operation terminal 20.

The traveling device 13 is a driving unit that causes the work vehicle 10 to travel. As shown in FIG. 2, the traveling device 13 has an engine 131, a front wheel 132, a rear wheel 133, a transmission 134, a front axle 135, a rear axle 136, and a steering wheel 137, and the like. It is noted that the front wheel 132 and the rear wheel 133 are provided on the left and right sides, respectively, of the work vehicle 10. Moreover, the traveling device 13 is not limited to of a wheel type having the front wheel 132 and the rear wheel 133 but may also be of a crawler type having crawlers provided on the left and right sides of the work vehicle 10.

The engine 131 is a driving source such as a diesel engine or a gasoline engine driven using fuel supplied to a fuel tank which is not illustrated. The traveling device 13 may include an electric motor as a driving source together with the engine 131 or instead of the engine 131. It is noted that a generator, which is not illustrated, is connected to the engine 131 and supplies power to electric components such as the vehicle control device 11, a battery and the like provided in the work vehicle 10. It is noted that the battery is charged by the power supplied from the generator. Then, the electric components such as the vehicle control device 11 and the positioning device 16 provided on the work vehicle 10 can be driven by the power supplied from the battery even after the engine 131 stops.

A driving force of the engine 131 is transmitted to the front wheel 132 via the transmission 134 and the front axle 135 and is transmitted to the rear wheel 133 via the transmission 134 and the rear axle 136. In addition, the driving force of the engine 131 is also transmitted to the work machine 14 via a PTO shaft (not illustrated). In a case where the work vehicle 10 performs automatic traveling, the traveling device 13 performs traveling operation in accordance with commands of the vehicle control device 11.

The work machine 14 is, for example, a cultivator, a mowing machine, a plow, a fertilizing machine, a seeding machine, a spraying machine, or the like, which can be attached to and removed from the work vehicle 10. As a result, the work vehicle 10 can perform various kinds of works by using each work machine 14. FIG. 2 shows a case where the work machine 14 is a cultivator.

In the work vehicle 10, the work machine 14 may be supported so as to be capable of being raised and lowered with a raising and lowering mechanism (not illustrated). The vehicle control device 11 can raise and lower the work machine 14 by controlling the raising and lowering mechanism. For example, the vehicle control device 11 lowers the work machine 14 in a case where the work vehicle 10 travels straight in a forward direction in the inner region Fa and the headland region Fb of the field F, and raises the work machine 14 in a case where the work vehicle 10 travels straight in a backward direction in the inner region Fa and the headland region Fb of the field F and a case where the work vehicle 10 turns and travels in the inner region Fa and the headland region Fb of the field F. In addition, in a case of obtaining a work stop instruction, the vehicle control device 11 outputs a work stop command to the work machine 14. For example, in a case where an operator performs an operation of a stop instruction on the operation terminal 20, the vehicle control device 11 obtains the stop instruction from the operation terminal 20. Upon obtaining the work stop instruction, the vehicle control device 11 stops driving the PTO shaft to stop work of the work machine 14.

The steering wheel 137 is an operating unit operated by an operator or the vehicle control device 11. For example, in the traveling device 13, an angle of the front wheel 132 is changed by a hydraulic power steering mechanism which is not illustrated or the like in response to an operation of the steering wheel 137 by the vehicle control device 11, and a travelling direction of the work vehicle 10 is changed. In a case where the operator performs a teaching operation upon registering the field F, the operator operates the steering wheel 137 to cause the work vehicle 10 to travel manually.

Furthermore, in addition to the steering wheel 137, the traveling device 13 includes a shift lever, an accelerator, and a brake, which are not illustrated, operated by the vehicle control device 11. Then, in the traveling device 13, a gear of the transmission 134 can be switched to a forward gear, a backward gear or the like in accordance with an operation of the shift lever by the vehicle control device 11, and a traveling mode of the work vehicle 10 can be switched to be forward, backward or the like. Moreover, the vehicle control device 11 controls a rotation speed of the engine 131 by operating the accelerator. Additionally, the vehicle control device 11 brakes rotation of the front wheel 132 and the rear wheel 133 with an electromagnetic brake by operating the brake.

The positioning device 16 is a communication apparatus having a positioning control unit 161, a storage unit 162, a communication unit 163, a positioning antenna 164 and the like. For example, the positioning device 16 is provided at an upper part of a cabin 138 which an operator rides, as shown in FIG. 2. Moreover, an installation place of the positioning device 16 is not limited to the cabin 138. Furthermore, the positioning control unit 161, the storage unit 162, the communication unit 163, and the positioning antenna 164 of the positioning device 16 may be disposed in a dispersed manner at different positions in the work vehicle 10. It is noted that the battery is connected to the positioning device 16 as described above, and the positioning device 16 can operate even while the engine 131 stops. In addition, as the positioning device 16, for example, a mobile phone terminal, a smart phone, a tablet terminal, or the like may be substituted.

The positioning control unit 161 is a computer system having one or a plurality of processors, and a storage memory such as a non-volatile memory and a RAM. The storage unit 162 is a non-volatile memory or the like that stores a program for causing the positioning control unit 161 to execute positioning processing and data such as positioning information and movement information. For example, the program is recorded in a computer-readable recording medium such as a flash ROM, an EEPROM, a CD or a DVD in a non-transitory manner, and is read by a predetermined reading device (not illustrated) to be stored in the storage unit 162. It is noted that the program may be downloaded from a server (not illustrated) to the positioning device 16 via the communication network N1 to be stored in the storage unit 162.

The communication unit 163 is a communication interface for connecting the positioning device 16 to the communication network N1 by wire or wireless means and for executing, via the communication network N1, data communication with external apparatus such as a base station (not illustrated) in accordance with a predetermined communication protocol.

The positioning antenna 164 is an antenna which receives radio waves (GNSS signals) transmitted from a satellite.

The positioning control unit 161 calculates a current position of the work vehicle 10 on the basis of GNSS signals that the positioning antenna 164 receives from a satellite. For example, in a case where the work vehicle 10 travels automatically in the field F, when the positioning antenna 164 receives radio waves (transmission time, orbital information, and the like) transmitted from each one of a plurality of satellites, the positioning control unit 161 calculates a distance between the positioning antenna 164 and each satellite, and calculates, on the basis of the calculated distance, a current position (latitude and longitude) of the work vehicle 10. Alternatively, the positioning control unit 161 may perform positioning by a real-time kinematic method (RTK-GPS positioning method (RTK method)) which calculates the current position of the work vehicle 10 using correction information that corresponds to a base station (reference station) near the work vehicle 10. As described above, the work vehicle 10 performs automatic traveling by using positioning information on the basis of the RTK-method. It is noted that the current position of the work vehicle 10 may be the same as a positioning position (for example, a position of the positioning antenna 164) or may be a position deviated from the positioning position.

The vehicle control device 11 has control apparatus such as a CPU, a ROM, and a RAM. The CPU is a processor that executes various types of arithmetic processing. The ROM is a non-volatile storage unit in which control programs, such as a BIOS and an OS, for causing the CPU to execute the various types of arithmetic processing are stored in advance. The RAM is a volatile or non-volatile storage unit that stores various pieces of information and is used as a transient storage memory (work region) of the various types of processing to be executed by CPU. Then, the vehicle control device 11 controls the work vehicle 10 by executing by the CPU various types of control programs stored in advance in the ROM or the storage unit 12.

The vehicle control device 11 controls an operation of the work vehicle 10 in response to various types of user's operations on the work vehicle 10. In addition, the vehicle control device 11 executes automatic traveling processing of the work vehicle 10 on the basis of a current position of the work vehicle 10 calculated by the positioning device 16 and a target route R set in advance.

As shown in FIG. 1, the vehicle control device 11 includes various types of processing units such as a traveling processing unit 111. It is noted that the vehicle control device 11 functions as the various types of processing units by executing by the CPU various types of processing in accordance with the automatic traveling program. Further, a part or all of the processing units may be configured by an electronic circuit. It is noted that the automatic traveling program may be a program for causing a plurality of processors to function as the processing units.

The traveling processing unit 111 controls travelling of the work vehicle 10. Specifically, upon obtaining a traveling start instruction from the operation terminal 20, the traveling processing unit 111 causes the work vehicle 10 to travel automatically. For example, when an operator presses a start button on an operation screen of the operation terminal 20, the operation terminal 20 outputs a traveling start instruction to the work vehicle 10. Upon obtaining the traveling start instruction from the operation terminal 20, the traveling processing unit 111 causes the work vehicle 10 to travel automatically. This causes the work vehicle 10 to, for example, start traveling automatically in accordance with a target route R (refer to FIG. 3) in the field F and to start work with the work machine 14. It is noted that the target route R on which the work vehicle 10 travels automatically is generated, for example, at the operation terminal 20. The work vehicle 10 obtains route data corresponding to the target route R from the operation terminal 20, and travels automatically in accordance with the target route R by.

It is noted that the target route R according to the present embodiment includes the inner work route Ra (refer to FIG. 3) which is a traveling route in the inner region Fa (work route and turning route), the headland work route Rb (refer to FIG. 3) which is a traveling route in the headland region Fb (work route), and a turning route in the headland region Fb (first turning route Rb1 (refer to FIG. 4E) and second turning route Rb2 (refer to FIG. 5E)).

Further, upon obtaining a traveling stop instruction from the operation terminal 20, the traveling processing unit 111 stops automatic traveling of the work vehicle 10. For example, when an operator presses a stop button on an operation screen of the operation terminal 20, the operation terminal 20 outputs a traveling stop instruction to the work vehicle 10.

In addition, in a case where the work vehicle 10 detects an obstacle, the traveling processing unit 111 stops automatic traveling of the work vehicle 10. For example, in a case where an obstacle detection device (not illustrated) mounted on the work vehicle 10 detects an obstacle in a range of 3 m to 8 m in front of the work vehicle 10, the traveling processing unit 111 causes the work vehicle 10 to decelerate traveling. Furthermore, in a case where the obstacle detection device detects an obstacle in a range up to 3 m in front of the work vehicle 10, the traveling processing unit 111 causes the work vehicle 10 to stop.

[Operation Terminal 20]

As illustrated in FIG. 1, the operation terminal 20 is an information processing device that has an operation control unit 21, a storage unit 22, an operation display unit 23, a communication unit 24, and the like. The operation terminal 20 may be configured with a mobile terminal such as a tablet terminal or a smartphone.

The communication unit 24 is a communication interface for connecting the operation terminal 20 to the communication network N1 by wire or wireless means and for executing, via the communication network N1, data communication with external apparatus such as one or plurality of the work vehicles 10 in accordance with a predetermined communication protocol.

The operation display unit 23 is a user interface having a display section, such as a liquid crystal display or an organic EL display, that displays various pieces of information and an operation section, such as a touch panel, a mouse, or keyboard, that receives operations. On an operation screen displayed on the display section, an operator can operate the operation section to perform an operation for registering various pieces of information (work vehicle information, field information, work information, and the like, as described below).

In addition, the operator can operate the operation section to provide a traveling start instruction, a traveling stop instruction, and the like to the work vehicle 10. Furthermore, in a place away from the work vehicle 10, the operator can grasp a traveling state of the work vehicle 10 that travel automatically in the field F in accordance with the target route R by a traveling trajectory displayed on the operation terminal 20.

The storage unit 22 is a non-volatile storage unit, such as an HDD or an SSD, that stores various pieces of information. The storage unit 22 stores control programs such as a route generation program for causing the operation control unit 21 to perform route generation processing (refer to FIG. 11), as described later. For example, the route generation program is recorded in a computer-readable recording medium such as a flash ROM, an EEPROM, a CD or a DVD in a non-transitory manner, and is read by a predetermined reading device (not illustrated) to be stored in the storage unit 22. It is noted that the route generation program may be downloaded from a server (not illustrated) to the operation terminal 20 via the communication network N1 to be stored in the storage unit 22.

In addition, the storage unit 22 has a dedicated application for causing the work vehicle 10 to travel automatically installed therein. The operation control unit 21 activates the dedicated application and performs setting processing of various pieces of information with regard to the work vehicle 10, generation processing of the target route R for the work vehicle 10, and an automatic traveling instruction to the work vehicle 10.

The storage unit 22 also stores data such as work vehicle information which is information with regard to the work vehicle 10 and target route information which is information with regard to the target route R. The work vehicle information includes information such as a vehicle number and a vehicle model for each work vehicle 10. The vehicle number is identification information of the work vehicle 10. The vehicle model is a model of the work vehicle 10.

It is noted that the storage unit 22 may store the work vehicle information with regard to one work vehicle 10 or may store the work vehicle information with regard to a plurality of work vehicles 10. For example, in a case where a particular operator owns a plurality of work vehicles 10, the work vehicle information with regard to each work vehicle 10 is stored in the storage unit 22.

The target route information includes information such as a route name, a field name, an address, a field area, and a working time for each target route R. The route name is a route name of the target route R generated at the operation terminal 20. The field name is a name of the field F to be worked in which the target route R has been set. The address is an address of the field F, and the field area is an area of the field F. The working time is a time required for work in the field F by the work vehicle 10.

It is noted that the storage unit 22 may store the target route information with regard to a first target route R, or may store the target route information with regard to a plurality of target routes R. For example, in a case where a particular operator generates a plurality of target routes R for one or a plurality of fields F owned by the operator, the target route information with regard to each target route R is stored in the storage unit 22. It is noted that one target route R may be set for one field F or a plurality of target routes R may be set for one field F.

As another embodiment, it is noted that some or all of the information, such as the work vehicle information and the target route information, may be stored on a server accessible from the operation terminal 20. An operator may perform an operation for registering the work vehicle information and the target route information on the server (for example, personal computer, cloud server, and the like). In this case, the operation control unit 21 may obtain the information from the server and execute each processing such as route generation processing (refer to FIG. 11) described later.

The operation control unit 21 has control apparatus such as a CPU, a ROM, and a RAM. The CPU is a processor that executes various types of arithmetic processing. The ROM is a non-volatile storage unit in which control programs, such as a BIOS and an OS, for causing the CPU to execute the various types of arithmetic processing are stored in advance. The RAM is a volatile or non-volatile storage unit that stores various pieces of information and is used as a transient storage memory of various types of processing to be executed by the CPU. Then, the operation control unit 21 controls the operation terminal 20 by executing by the CPU various types of control programs stored in advance in the ROM or the storage unit 22.

As shown in FIG. 1, the operation control unit 21 includes various types of processing sections such as a setting processing section 211, a reception processing section 212, a generation processing section 213, a determination processing section 214, and a decision processing section 215. It is noted that the operation control unit 21 functions as various types of the processing sections by executing by the CPU various types of processing in accordance with the control programs. Further, a part or all of the processing units may be configured by an electronic circuit. It is noted that the control program may be a program for causing a plurality of processors to function as the processing sections.

The setting processing section 211 sets information with regard to the work vehicle 10 (hereinafter referred to as work vehicle information), information with regard to the field F (hereinafter referred to as field information), and information with regard to how to specifically perform work (hereinafter referred to as work information). The setting processing section 211 receives setting operations by an operator, for example, on the menu screen D1 shown in FIG. 6, and registers each setting information.

Specifically, operator's registration operation on the operation terminal 20 causes the setting processing section 211 to set information such as a machine type of the work vehicle 10, a position where the positioning antennas 164 are mounted on the work vehicle 10, a type of the work machine 14, a size and a shape of the work machine 14, a position of the work machine 14 relative to the work vehicle 10, a vehicle speed and an engine rotational speed during work of the work vehicle 10, and vehicle speed and an engine rotational speed during turning of the work vehicle 10.

The registration operation on the operation terminal 20 also causes the setting processing section 211 to set information such as a position and a shape of the field F, a work starting position S (traveling starting position) at which work is started and a work ending position G (traveling ending position) at which work is ended, and a work direction.

The information on the position and the shape of the field F can be obtained automatically, for example, by an operator riding the work vehicle 10 and driving so as to circle around along an outer periphery within a region to be registered, and then recording a transition of position information of the positioning antenna 164. The region specified by the obtained position and shape of the field F is a region (traveling region) where the work vehicle 10 can be caused to travel. For example, the setting processing section 211 registers field information for the field F shown in FIG. 3.

In addition, the setting processing section 211 is configured to be capable of setting as work information presence or absence of cooperative work between the work vehicle 10 (unmanned tractor) and the manned work vehicle 10, the number of skips which is the number of work routes to be skipped in a case where the work vehicle 10 turns in a headland, a width of the headland, a width of a non-cultivated land and the like.

On the basis of each setting information, the setting processing section 211 also generates a target route R on which the work vehicle 10 is caused to travel automatically in the field F. Specifically, the setting processing section 211 generates the target route R in the field F on the basis of a work starting position S and a work ending position G registered in the field setting. For example, as shown in FIG. 3, the setting processing section 211 generates the target route R including the work starting position S, the work ending position G, the inner work route Ra, the headland work route Rb, and turning routes (first turning route Rb1

(refer to FIG. 4E) and second turning route Rb2 (refer to FIG. 5E)) on the basis of an operator's setting operation. The setting processing section 211 registers the generated target route R in association with the field F.

Here, the operation control unit 21 generates the target route R on the basis of an operation by an operator as shown below.

Figure 6:
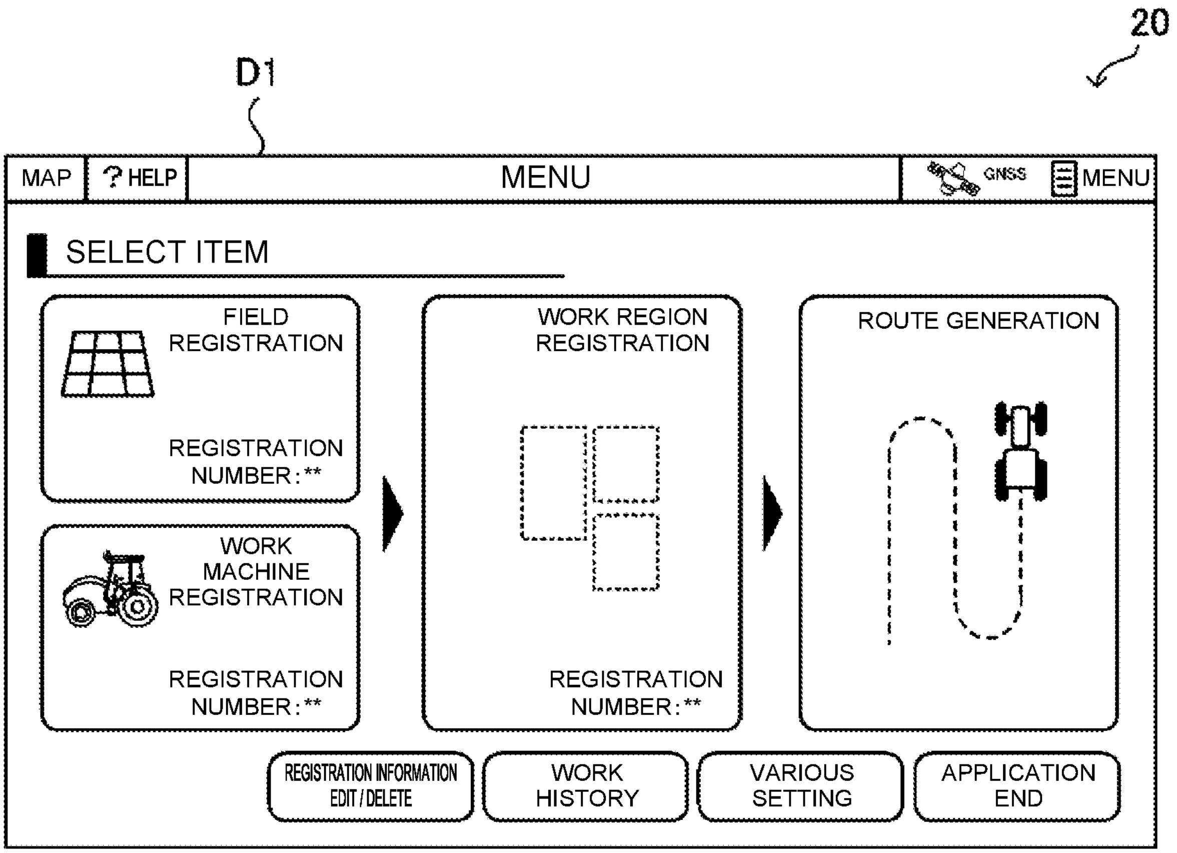
FIG. 6 is a diagram illustrating one example of a menu screen displayed on an operation terminal according to an embodiment of the present invention.
Figure 7:
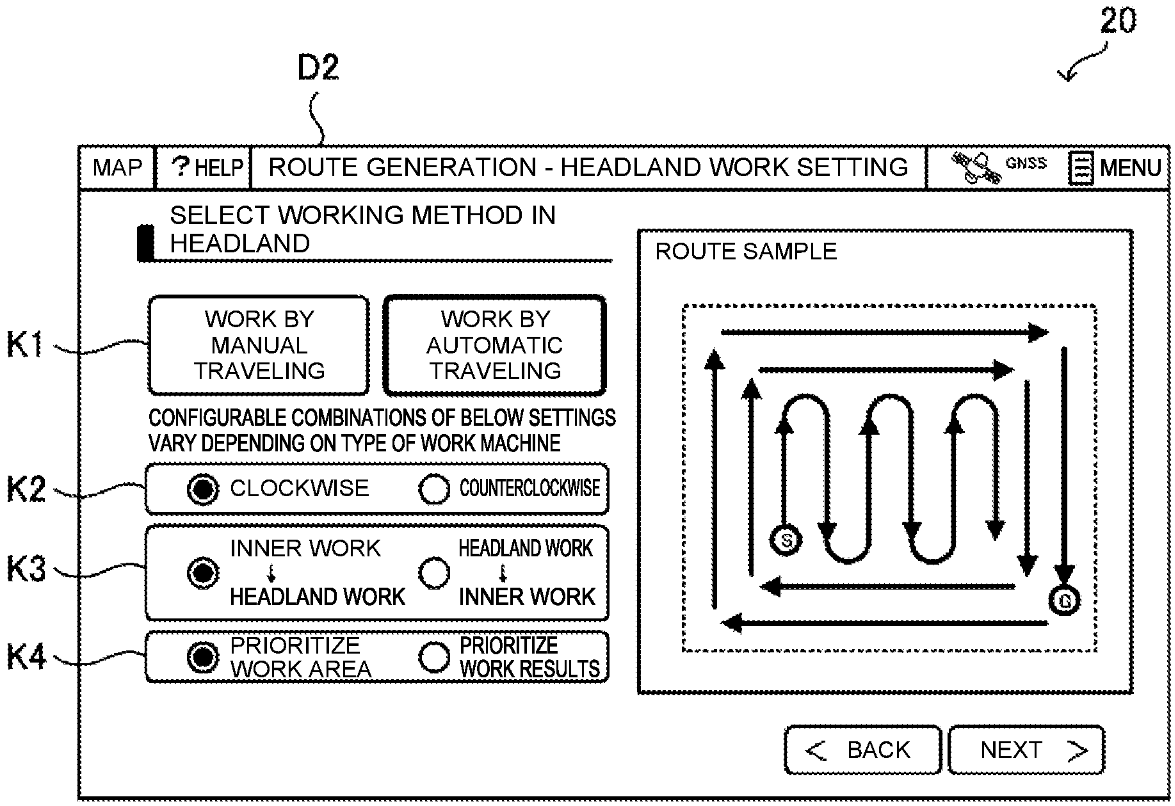
FIG. 7 is a diagram illustrating one example of a headland work registration screen displayed on an operation terminal according to an embodiment of the present invention.

Specifically, the reception processing section 212 receives an operation to select "route generation" from the operator on the menu screen D1 (refer to FIG. 6). Upon receiving a selection operation of "route generation" by the reception processing section 212, the operation control unit 21 shifts to a registration mode to register information necessary for route generation. The operation control unit 21 displays a headland work registration screen D2 (refer to FIG. 7) on the operation display unit 23 in the registration mode. The headland work registration screen D2 displays a selection button K1 to select whether the headland region Fb is to be worked by manual traveling or to be worked by automatic traveling, a selection button K2 to select a work direction of the work vehicle 10 ("clockwise" or "counterclockwise"), a selection button K3 to select a work order ("inner work to headland work" or "headland work to inner work"), and a selection button K4 to select a priority mode ("prioritize work area" or "prioritize work result").

Here, a priority mode of "prioritize work area" (work area priority mode) (first selection mode of the present invention) is a mode that prioritizes an increase in an area that can be worked by automatic traveling (maximization of work area) rather than better work results in the field F. As described above, according to the second turning route Rb2 (refer to FIG. 5E) in the second turning mode, although there is a disadvantage that the work vehicle 10 steps into the worked region B1 upon turning, a region required for the work vehicle 10 to turn (turning region) can be reduced, and therefore, an area that can be worked by automatic traveling can be increased. In a case where an operator desires to maximize the work area, the operator selects the work area priority mode. In a case where the work area priority mode is selected by the operator, the operation control unit 21 permits generation of the second turning route Rb2.

In contrast, a priority mode of "prioritize work results" (work result priority mode) (second selection mode of the present invention) is a mode that prioritizes better work results in the field F rather than an increase in an area that can be worked by automatic traveling. As described above, according to the first turning route Rb1 (refer to FIG. 4E) for the first turning mode, although there is a disadvantage that a region required for the work vehicle 10 to turn (turning region) is increased, the work vehicle 10 does not step into the worked region B1 upon turning, and therefore, the work results can be kept in a good condition. In a case where an operator desires to keep the work results in a good condition, the operator selects the work result priority mode. In a case where the work result priority mode is selected by the operator, the operation control unit 21 permits generation of the first turning route Rb1 and prohibits generation of the second turning route Rb2.

The reception processing section 212 receives selection operations of selection buttons K1 to K4 from an operator on the headland work registration screen D2. It is noted that the reception processing section 212 may receive the selection operations of the selection buttons K2 to K4 on a condition that the selection button K1 for "work by automatic traveling" has been selected. In addition, the reception processing section 212 displays a route sample corresponding to the operator's selection operation on the headland work registration screen D2 (refer to FIG. 7).

The generation processing section 213 generates a target route R on which the work vehicle 10 is caused to travel automatically. Specifically, the generation processing section 213 generates an inner work route Ra which is a travel route of the inner region Fa. For example, in a case where the field F shown in FIG. 3 is registered, the generation processing section 213 generates an inner work route Ra on which the work vehicle 10 travels back and forth in an inner region Fa. It is noted that the inner work route Ra includes a turning route connecting adjacent straight routes (linear route) with each other.

In addition, the generation processing section 213 also generates a headland work route Rb (linear route) on which the work vehicle 10 circulates and travels in the headland region Fb. The generation processing section 213 also generates a turning route in the headland region Fb. A method for generating a turning route in the headland region Fb will be described below.

Specifically, with regard to each turning portion within the headland region Fb, the determination processing section 214 determines whether or not it is possible to generate a turning route in accordance with the priority mode selected by an operator. In addition, with regard to each one of the turning portions, the decision processing section 215 decides a turning mode (first turning mode or second turning mode) of a turning route on which the work vehicle 10 is caused to turn and travel on the basis of an operator's selection operation. The generation processing section 213 also generates a turning route for the turning mode determined on the basis of the operator's selection operation in the headland region Fb.

Figure 8:
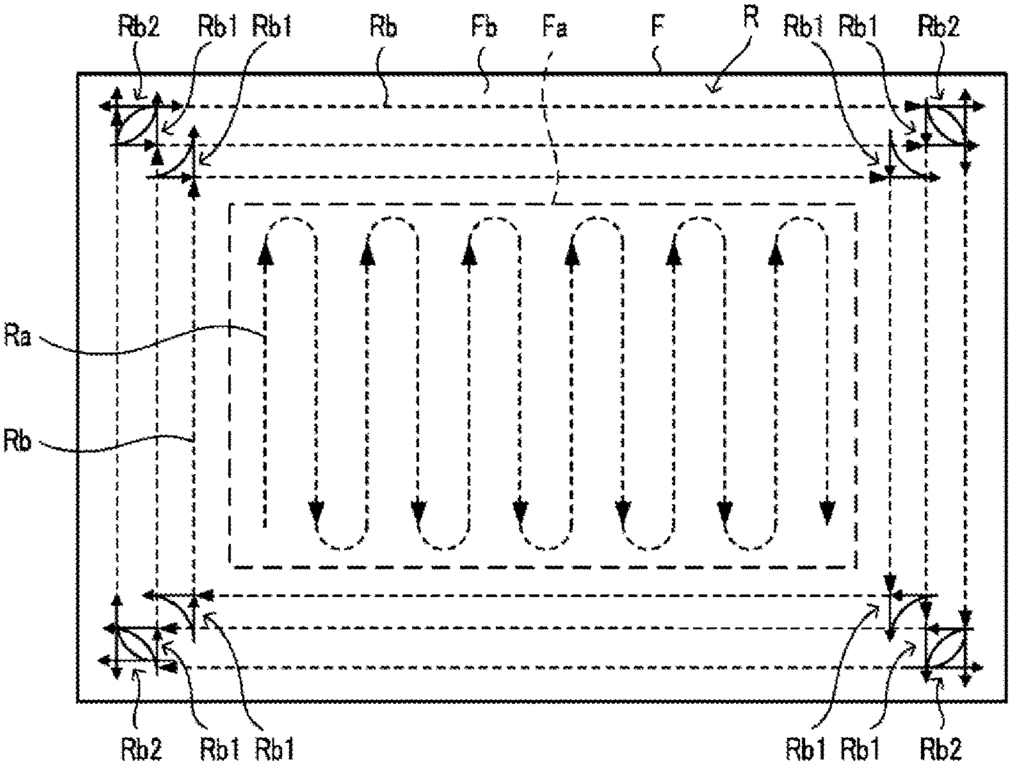
FIG. 8 is a diagram illustrating one example of a target route in a work area priority mode according to an embodiment of the present invention.

FIG. 8 shows a turning route in a case where the work area priority mode is selected as the priority mode by an operator. For example, the determination processing section 214 determines whether or not a first turning route Rb1 can be generated at a turning portion following the headland work route Rb. In a case where the turning portion has enough size to generate the first turning route Rb1, the decision processing section 215 decides a turning mode at the turning portion to be the first turning mode (refer to FIG. 4A to FIG. 4E). In this case, the generation processing section 213 generates the first turning route Rb1 for the first turning mode at the turning portion.

When the generation processing section 213 generates the first turning route Rb1, it generates the headland work route Rb following the first turning route Rb1, and the determination processing section 214 determines whether or not the first turning route Rb1 can be generated at the turning portion following the headland work route Rb.

Here, in a case where the turning portion does not have enough large size to generate the first turning route Rb1, the decision processing section 215 determines a turning mode of the turning portion to be the second turning mode (refer to FIG. 5A to FIG. 5E). In this case, the generation processing section 213 generates a second turning route Rb2 in the second turning mode for the turning portion.

Thus, in the work area priority mode, the generation processing section 213 generates the first turning route Rb1 as long as it is possible to generate the first turning route Rb1 at each turning portion, and in a case where there occurs a turning portion that cannot generate the first turning route Rb1, the generation processing section 213 generates the second turning route Rb2 for that turning portion. In addition, the generation processing section 213 generates the first turning route Rb1 on the inner region Fa side of the headland region Fb, and the second turning route Rb2 on an outer peripheral side of the headland region Fb. FIG. 8 shows a target route R which has thus been generated. In the target route R in FIG. 8, a second turning route Rb2 is generated at the outermost periphery of the headland region Fb. As shown in FIG. 8, since the work area priority mode enable the work vehicle 10 to travel automatically and work to the vicinity of the boundary of the field F, it is possible to maximize work area.

Figure 9:
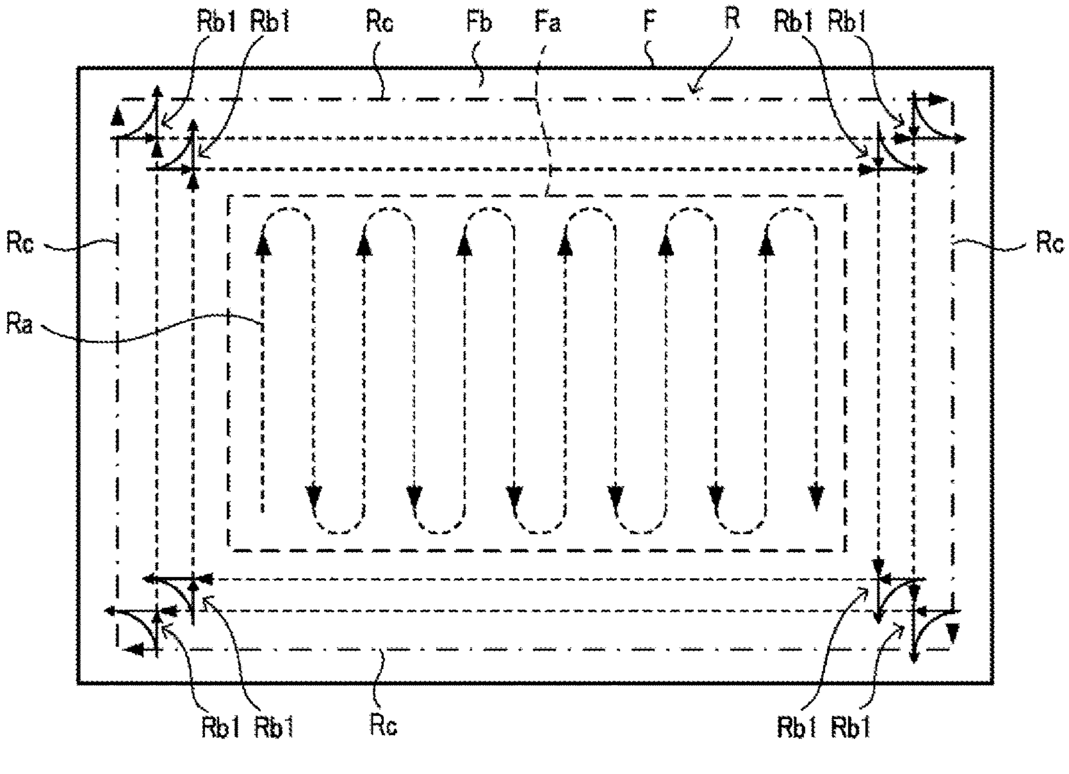
FIG. 9 is a diagram illustrating one example of a target route in a work result priority mode according to an embodiment of the present invention.

FIG. 9 shows a turning route in a case where the work result priority mode is selected as the priority mode by an operator. In a case where a first turning route Rb1 can be generated at a turning portion in the same way as the work area priority mode, the decision processing section 215 decides a turning mode of the turning portion to be a first turning mode (refer to FIG. 4A to FIG. 4E), and the generation processing section 213 generates the first turning route Rb1 for the first turning mode at the turning portion.

In contrast, in a case a first turning route Rb1 cannot be generated at the turning portion, the generation processing section 213 terminates generation of a turning route. That is to say, the generation processing section 213 generates a first turning route Rb1 on the inner region Fa side of the headland region Fb and does not generate a second turning route Rb2 in the headland region Fb.

Thus, in the work result priority mode, the generation processing section 213 generates a first turning route Rb1 as long as it is possible to generate the first turning route Rb1, and terminates the generation of a turning route in a case where it is no longer possible to generate the first turning route Rb1. The generation processing section 213 also generates a first turning route Rb1 on the inner region Fa side of the headland region Fb. FIG. 9 shows a target route R that has thus been generated. In FIG. 9, the target route R does not include a second turning route Rb2, and no traveling route for automatic traveling is generated at the outermost periphery of the headland region Fb. In this case, a headland work route Rc at the outermost periphery of the headland region Fb is a route on which an operator performs work by manual traveling. As shown in FIG. 9, since the work result priority mode prevents worked region from being trampled, it is possible to keep the work results in a good condition.

Figure 10:
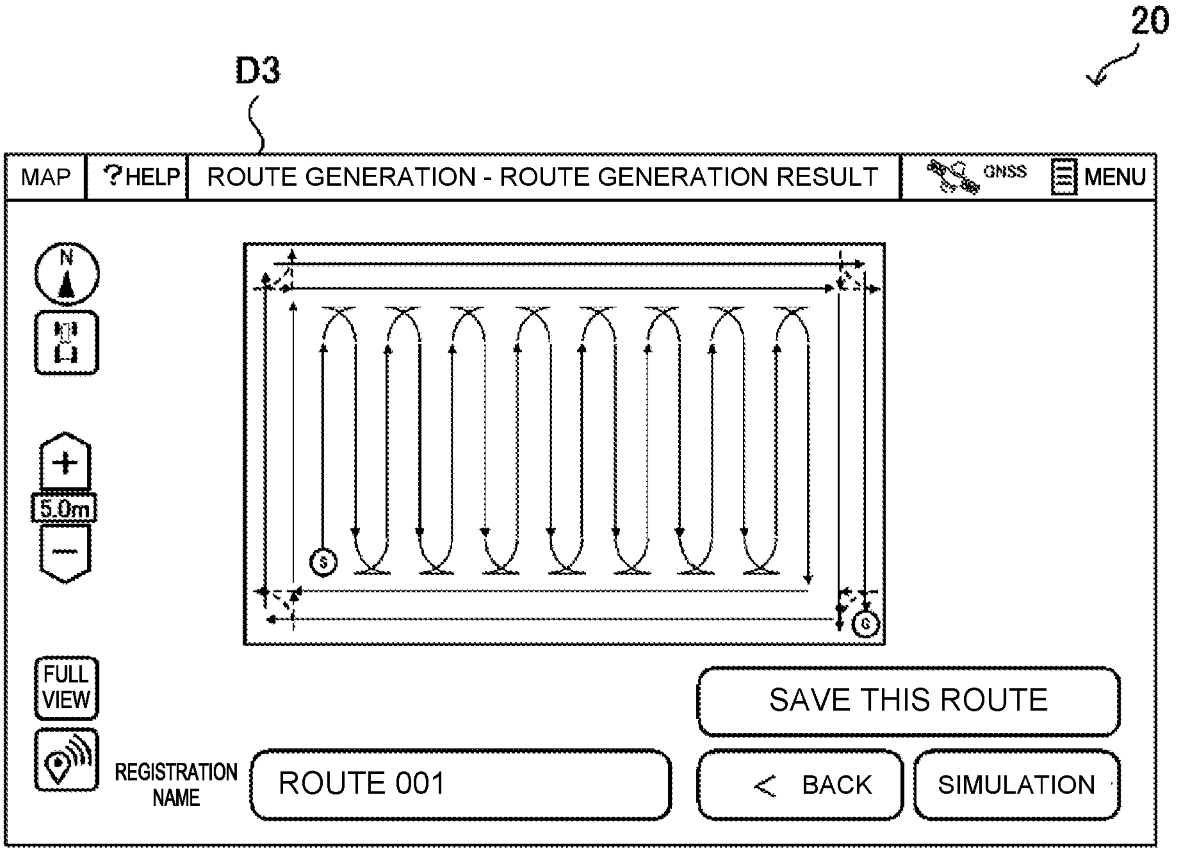
FIG. 10 is a diagram illustrating one example of a route generation result screen displayed on an operation terminal according to an embodiment of the present invention.

The generation processing section 213 displays a target route R generated by either the work area priority mode or the work result priority mode on a route generation result screen D3 (refer to FIG. 10). On the route generation result screen D3, an operator checks the generated target route R and performs a registration operation in a case where the target route R is what has been intended by the operator. When the operator performs the registration operation, the operation control unit 21 registers the target route R in association with the field F. In addition, the operation control unit 21 outputs route data of the registered target route R to the work vehicle 10. The generation processing section 213 is an example of a first to a third generation processing sections of the present invention.

The work vehicle 10 is configured so that route data of a target route R generated at the operation terminal 20 is transferred to the work vehicle 10 to be stored in the storage unit 12 as well as that while detecting a current position of the work vehicle 10, the positioning antenna 164 enables the work vehicle 10 to travel autonomously in accordance with the target route. It is noted that a current position of the work vehicle 10 usually coincides with a position of the positioning antenna 164.

In addition, the work vehicle 10 is configured to be capable of traveling automatically in the field F in a case where its current position coincides with the work starting position S (refer to FIG. 3) in the field F. For example, in a case where a current position of the work vehicle 10 coincides with the work starting position S in the field F and when a start button is pressed on the operation screen (not illustrated) by an operator to give a traveling start instruction to the work vehicle 10, the traveling processing unit 111 of the work vehicle 10 causes the work vehicle 10 to start travelling automatically on the target route R.

The traveling processing unit 111 causes the work vehicle 10 to travel automatically from the work starting position S to the work ending position G in the field F in accordance with the target route R (refer to FIG. 3). While the work vehicle 10 is traveling automatically, the operator can grasp a traveling state of the work vehicle 10 in the field F, at the operation terminal 20.

It is noted that the operation terminal 20 may be capable of accessing a website (agricultural support site) of an agricultural support service provided by a server (not illustrated) via the communication network N1. In this case, a browser program is executed by the operation control unit 21, so that the operation terminal 20 can function as a terminal for operating the server. Then, the server is provided with the above-mentioned processing units to execute each processing.

[Route Generation Processing]

Figure 11:
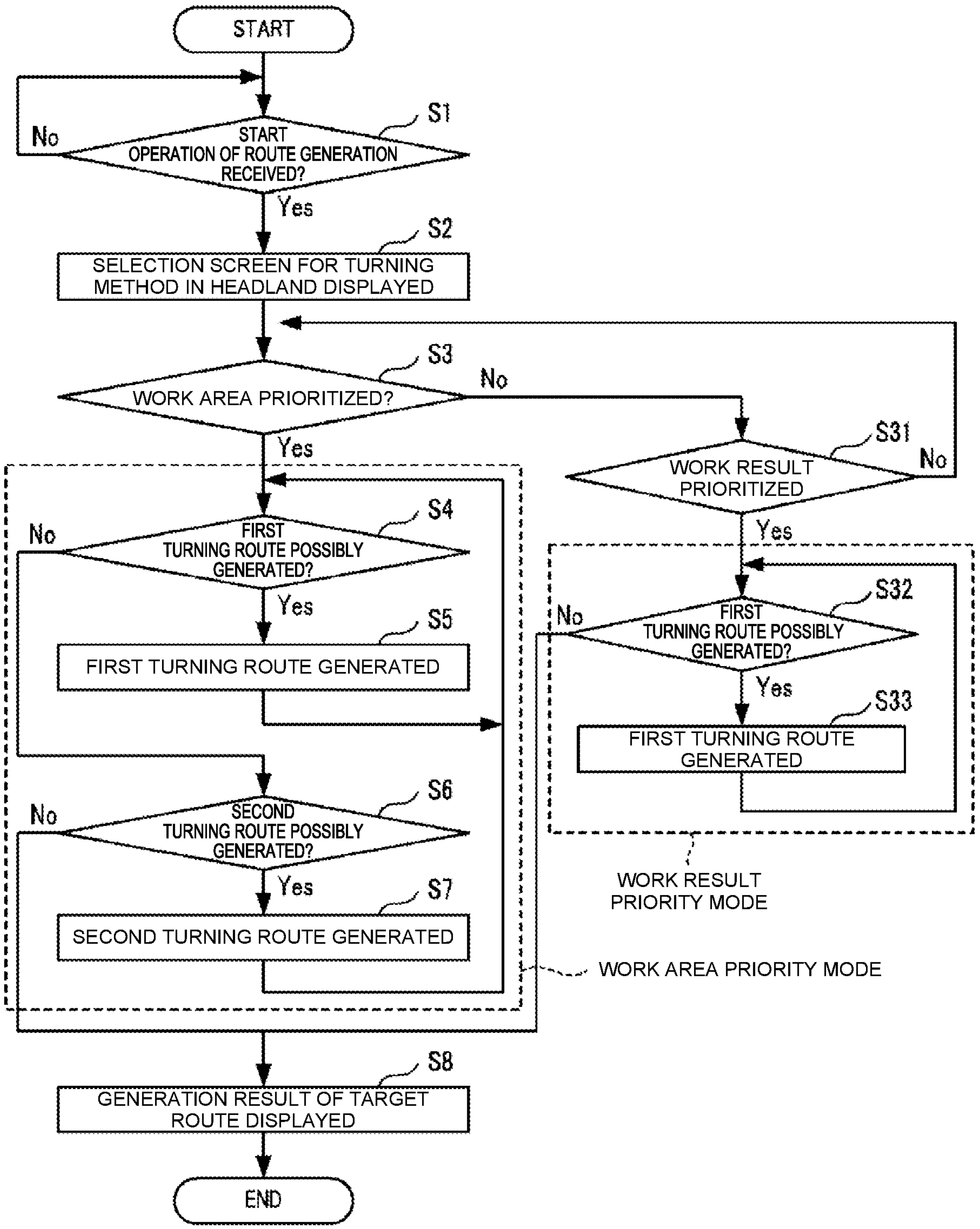
FIG. 11 is a flowchart illustrating one example of a procedure of route generation processing executed by automatic traveling system according to an embodiment of the present invention.

One example with regard to the route generation processing executed by the automatic traveling system 1 will be described below with reference to FIG. 11.

It is noted that the present invention can be recognized as an invention of a route generation method that executes one or a plurality of steps included in the route generation processing. Further, one or a plurality of steps included in the route generation processing described herein may be appropriately omitted. It is noted that each step in the route generation processing may be executed in a different order to the extent that the same effect is obtained. In addition, although a case where the operation control unit 21 executes each step in the route generation processing is described herein as an example, a route generation method in which one or a plurality of processors execute each step in the route generation processing in a dispersed manner is also considered as another embodiment.

First, in a step S1, the operation control unit 21 of the operation terminal 20 determines whether or not a start operation of route generation has been received from an operator. When the operation control unit 21 receives a start operation of route generation (S1: Yes), the operation control unit 21 shifts the processing to a step S2. The operation control unit 21 stands by until it receives a start operation of route generation (S1:No). For example, when the operator selects, "route generation" on the menu screen D1 (refer to FIG. 6), the operation control unit 21 receives the start operation. When the operation control unit 21 receives the start operation, it shifts to a registration mode for registering information necessary for route generation. Upon shifting to the registration mode, the operator sets use conditions of the work vehicle 10 (unmanned travelling, manned travelling, or the like), a turning method, a vehicle speed, an engine rotational speed, and the like.

In the step S2, the operation control unit 21 displays the headland work registration screen D2 (refer to FIG. 7) for setting a working method in the headland region Fb. The operator selects the working method ("work by manual traveling" or "work by automatic traveling"), a work direction ("clockwise" or "counterclockwise"), a work order ("inner work to headland work" or "headland work to inner work"), and a priority mode ("prioritize work area" or "prioritize work result") on the headland work registration screen D2.

In a step S3, the operation control unit 21 determines whether or not "prioritize work area" (work area priority mode) has been selected. When the work area priority mode has been selected (S3: Yes), the operation control unit 21 shifts the processing to a step S4. On the other hand, in a case where the work area priority mode has not been selected (S3: No), the operation control unit 21 shifts the processing to a step S31.

In the step S31, the operation control unit 21 determines whether or not "prioritize work result" (work result priority mode) has been selected. When the work result priority mode has been selected (S31: Yes), the operation control unit 21 shifts the processing to a step S32. On the other hand, in a case where the work result priority mode has not been selected (S31: No), the operation control unit 21 shifts the processing to the step S3.

In a case where the work area priority mode has been selected (S3: Yes), the operation control unit 21 executes route generation processing (refer to FIG. 8) in accordance with the work area priority mode (S4 to S7), and in a case where the work result priority mode has been selected (S31: Yes), the operation control unit 21 executes route generation processing (refer to FIG. 9) in accordance with the work result priority mode (S32 to S33). It is noted that In the route generation processing in each priority mode, the operation control unit 21 generates the inner work route Ra (refer to FIG. 8 and FIG. 9) of the inner region Fa.

In a step S4, the operation control unit 21 determines whether or not a first turning route Rb1 can be generated at a turning portion. In a case where the operation control unit 21 can generate the first turning route Rb1 at the turning portion (S4: Yes), the operation control unit 21 shifts the processing to a step S5. On the other hand, in a case where the operation control unit 21 cannot generate the first turning route Rb1 at the turning portion (S4: No), the operation control unit 21 shifts the processing to a step S6.

In the step S5, the operation control unit 21 determines a turning mode at the turning portion to be the first turning mode and generates the first turning route Rb1 (refer to FIG. 8). After the step S5, the operation control unit 21 shifts the processing to the step S4. The operation control unit 21 generates the first turning route Rb1 at each turning portion until there occurs a turning portion that cannot generate the first turning route Rb1.

In the step S6, the operation control unit 21 determines whether or not a second turning route Rb2 can be generated at the turning portion. In a case where the operation control unit 21 can generate the second turning route Rb2 at the turning portion (S6: Yes), the operation control unit 21 shifts the processing to a step S7. On the other hand, if the operation control unit 21 cannot generate the second turning route Rb2 at the turning portion (S6: No), the operation control unit 21 shifts the processing to a step S8.

In the step S7, the operation control unit 21 determines a turning mode at the turning portion to be the second turning mode to generate the second turning route Rb2 (refer to FIG. 8). After the step S7, the operation control unit 21 shifts the processing to the step S4.

In route generation processing according to the work area priority mode, the operation control unit 21 generates the first turning route Rb1 until it is no longer possible to generate the first turning route Rb1 from the inner region Fa toward the outer peripheral side of the headland region Fb, and generates the second turning route Rb2 in a case where it is no longer possible to generate the first turning route Rb1.

On the other hand, in a step S32, the operation control unit 21 determines whether or not the first turning route Rb1 can be generated at a turning portion. In a case where the operation control unit 21 can generate the first turning route Rb1 at the turning portion (S32: Yes), the operation control unit 21 shifts the processing to a step S33. On the other hand, in a case where the operation control unit 21 cannot generate the first turning route Rb1 at the turning portion (S32: No), the operation control unit 21 shifts the processing to the step S8.

In the step S33, the operation control unit 21 decides a turning mode at the turning portion to be the first turning mode and generates the first turning route Rb1 (refer to FIG. 9). After the step S33, the operation control unit 21 shifts the processing to the step S32. The operation control unit 21 generates the first turning route Rb1 at each turning portion until there occurs a turning portion that cannot generate the first turning route Rb1.

In route generation processing according to the work result priority mode, the operation control unit 21 terminates generation of a turning route when it is no longer possible to generate the first turning route Rb1 from the inner region Fa toward the outer peripheral side of the headland region Fb.

In the step S8, the operation control unit 21 generates the target route R and displays the generated results on the route generation result screen D3 (refer to FIG. 10). The operation control unit 21 displays the target route R shown in FIG. 8 on the route generation result screen D3 in the work area priority mode and displays the target route R shown in FIG. 9 on the route generation result screen D3 in the work result priority mode. When the operator performs a registration operation on the route generation result screen D3, the operation control unit 21 registers the target route R in association with the field F. In addition, the operation control unit 21 outputs route data of the registered target route R to the work vehicle 10.

As described above, the operation control unit 21 generates the target route R on which the work vehicle 10 is caused to travel automatically in the field F on the basis of the operator's operation.

When the work vehicle 10 acquires the route data, it starts automatic traveling in response to the operator's operation. As a result, the work vehicle 10 performs predetermined work (for example, cultivation work) in the field F (refer to FIG. 3) while traveling automatically in accordance with the target route R from the work starting position S to the work ending position G.

As described above, the automatic traveling system 1 according to the present embodiment generates an inner work route Ra on which a work vehicle 10 is caused to travel in an inner region Fa of a field F, and generates a headland work route Rb on which the work vehicle 10 is caused to travel in a headland region Fb around the inner region Fa of the field F. In addition, the automatic traveling system 1 decides a turning mode of a turning route on which the work vehicle 10 is caused to turn and travel in the headland region Fb on the basis of an operator's selection operation, and generates the turning route for the turning mode decided on the basis of the operator's selection operation in the headland region.

The turning mode includes a first turning mode (first turning route Rb1) for turning backward after traveling forward and a second turning mode (second turning route Rb2) for turning forward after traveling backward. For example, the first turning route Rb1 includes a turning route for turning backward after traveling straight in a forward direction and a turning route for turning backward after turning forward. The second turning route Rb2 includes a turning route for turning forward after traveling straight in a backward direction and a turning route for turning forward after turning backward. The automatic traveling system 1, for example, generates a turning route (refer to FIG. 8) that includes the first turning route Rb1 for the first turning mode and the second turning route Rb2 for the second turning mode in a case where the work area priority mode (first selection mode) is selected by an operator, and generates a turning route (refer to FIG. 9) that includes the first turning route Rb1 and does not include the second turning route Rb2 in a case where the work result priority mode (second selection mode) is selected by an operator.

According to the above-mentioned configuration, an operator can select either a mode for maximizing work area by automatic traveling or a mode for prioritizing work results, and generate a target route R corresponding to the selected mode. Thus, it is possible to generate a target route R including a turning route that meets the operator's demand.

Other Embodiments

In the embodiments described above, when generating a turning route in the headland region Fb in the work result priority mode, the operation control unit 21 is configured to generate the first turning route Rb1 as long as it is possible to generate the first turning route Rb1, and to terminate the generation of a turning route in a case where it is no longer possible to generate the first turning route Rb1. (refer to FIG. 9 and FIG. 11). The above-mentioned configuration is applicable to a shape of the field F such that a turning center of the work vehicle 10 at a turning portion is within a worked region. For example, as shown in FIG. 5B to FIG. 5E, the turning center of the work vehicle 10 exists within a worked region at a turning portion (convex corner portion) where the worked region is disposed in the same direction as a turning direction of the work vehicle 10 (here, the right side).

Figure 12:
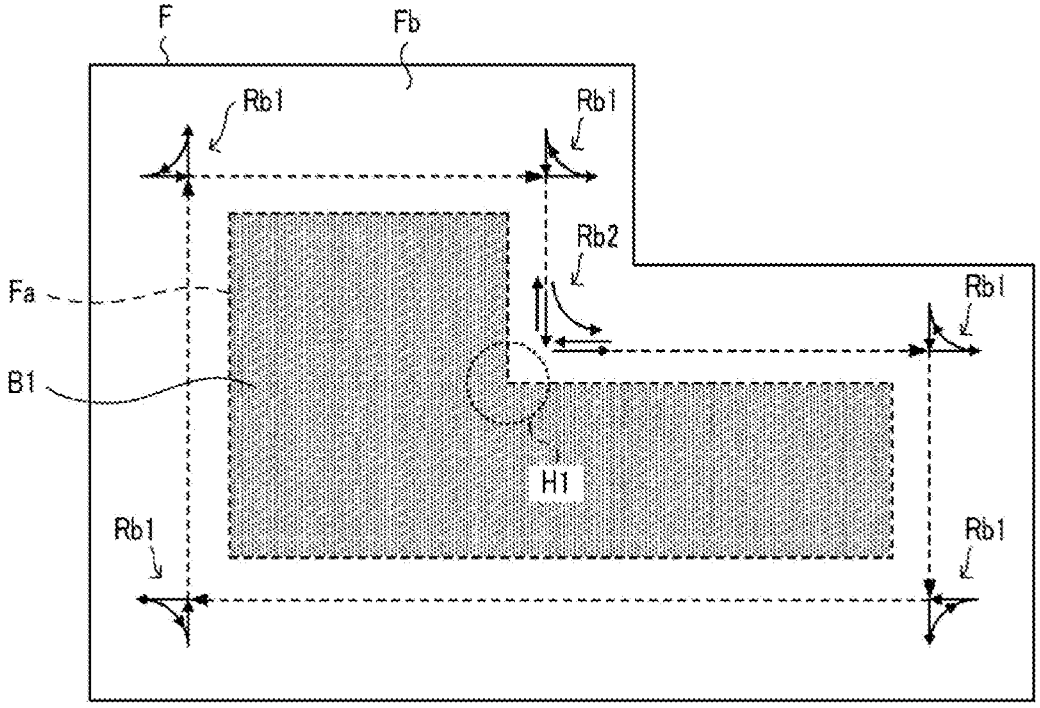
FIG. 12 is a diagram illustrating one example of a field and a target route according to another embodiment of the present invention.

In contrast, as shown in a turning portion H1 of FIG. 12, a turning center of the work vehicle 10 exists outside a worked region (within an unworked region) at a turning portion (concave corner portion) where the worked region is disposed in a direction (right side) opposite to a turning direction (left turning) of the work vehicle 10. In an example shown in FIG. 12, the turning center exists within the headland region Fb, which is an unworked region. In such a shape of the field F (turning portion H1) with an L-shaped portion, the operation control unit 21 permits generation of the second turning route Rb2 (refer to FIG. 12) when generating a turning route in the headland region Fb in the work result priority mode. Therefore, in the case of the field F shown in FIG. 12, the operation control unit 21 generates the first turning route Rb1 or the second turning route Rb2 for each turning portion as long as it is possible to generate the first turning route Rb1 or the second turning route Rb2, and terminates the route generation in a case where it is no longer possible to generate either the first turning route Rb1 or the second turning route Rb2.

Furthermore, in the case of the field F shown in FIG. 12, it is preferable that the operation control unit 21 should generate a turning route such that the work vehicle 10 does not step into the worked region B1 at the turning portion H1.

Figure 13A:
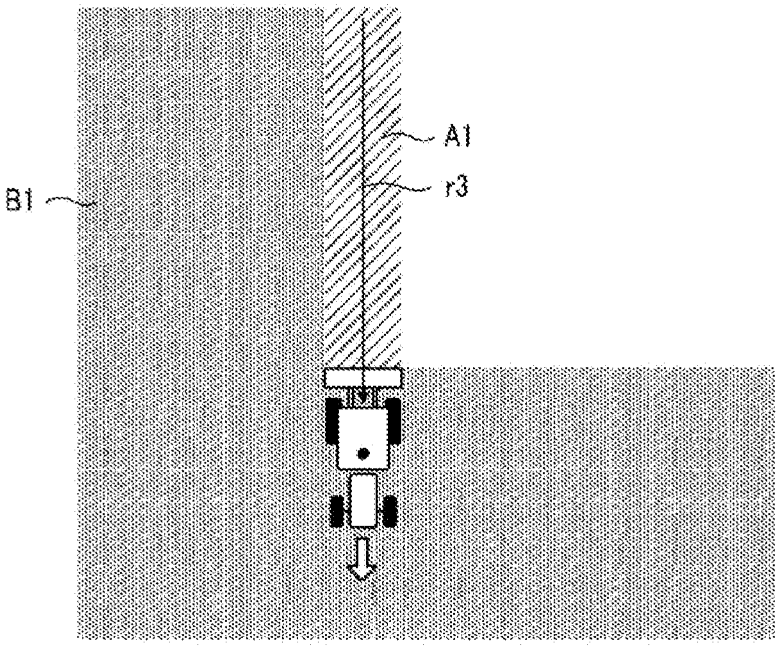
FIG. 13A is a diagram illustrating one example of a conventional turning method in the field illustrated in FIG. 12.
Figure 13B:
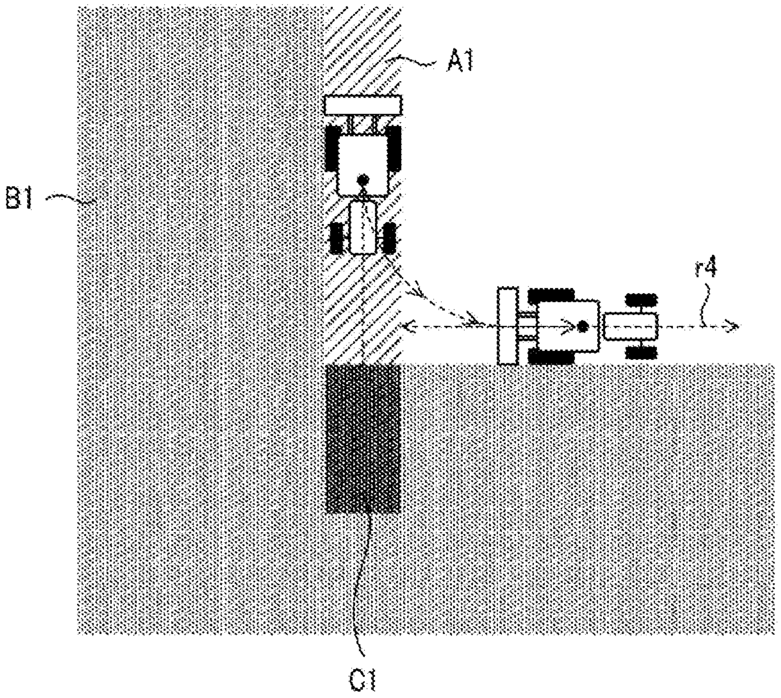
FIG. 13B is a diagram illustrating one example of a conventional turning method in the field illustrated in FIG. 12.

FIGS. 13A and 13B show an example of a conventional turning method at the turning portion H1. In the turning method, the work vehicle 10 travels straight in a forward direction on a headland work route r3 up to a position where the work machine 14 reaches a boundary of the worked region B1 (refer to FIG. 13A), raises the work machine 14 to travel straight in a backward direction on the headland work route r3 when the work machine 14 reaches the position, and turns and travels in a forward direction toward a headland work route r4 at a predetermined position (refer to FIG. 13B). Then, the work vehicle 10 travels straight in the backward direction on the headland work route r4, and lowers the work machine 14 to switch to the forward direction when reaching a boundary of the worked region A1, and resumes work while traveling straight on the headland work route r4.

With the above-mentioned turning method, as shown in FIG. 13B, the work vehicle 10 steps into the worked region B1 upon turning, and the worked region (stepping region C1) becomes trampled.

Figure 14A:
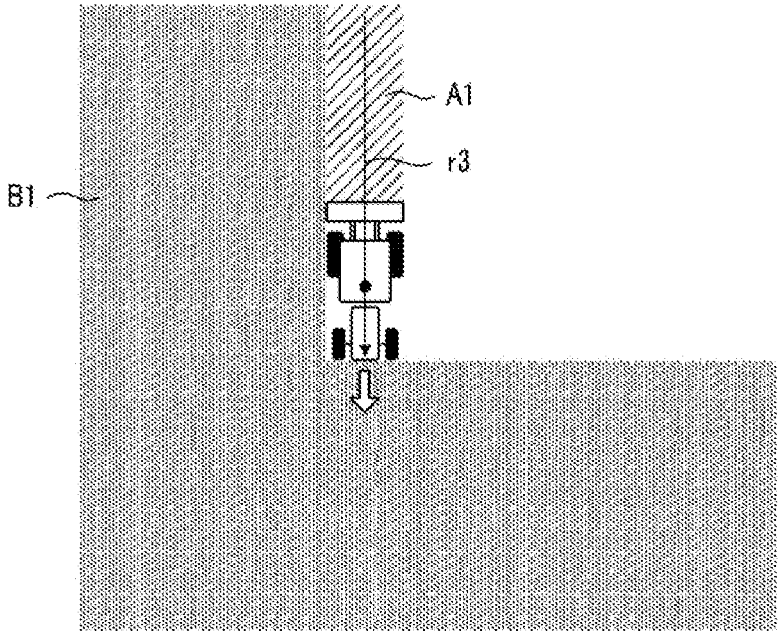
FIG. 14A is a diagram illustrating one example of a turning method according to the present embodiment in the field illustrated in FIG. 12.
Figure 14B:
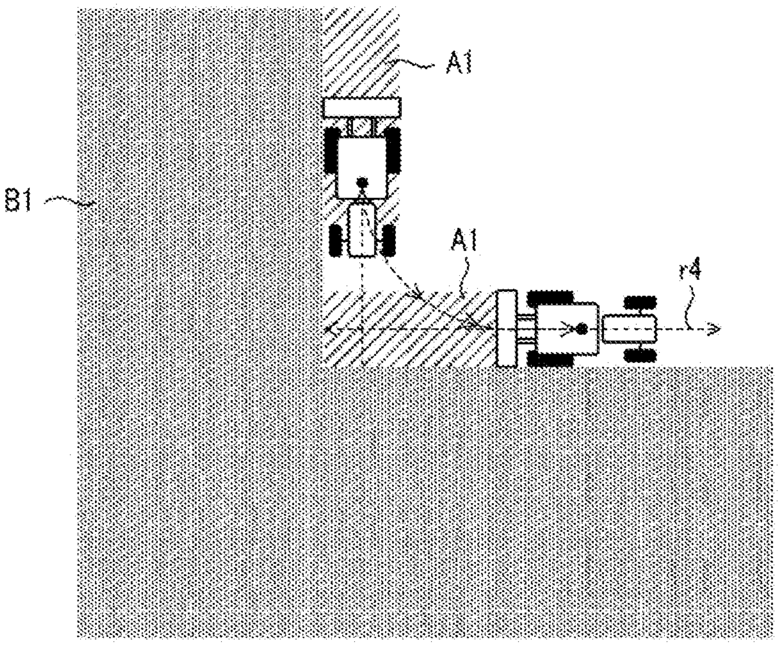
FIG. 14B is a diagram illustrating one example of a turning method according to the present embodiment in the field illustrated in FIG. 12.

Therefore, the automatic traveling system 1 according to the present embodiment executes a turning method for preventing the above-mentioned trampling (stepping region C1). FIG. 14A and FIG. 14B show one example of a turning method according to the present embodiment in the turning portion H1. In the turning method, the work vehicle 10 travels straight in a forward direction on the headland work route r3 up to a position where the front wheels 132 reach a boundary of the worked region B1 (refer to FIG. 14A), raises the work machine 14 to travel straight in a backward direction on the headland work route r3 when the work machine 14 reaches the position, and turns and travels in a forward direction toward the headland work route r4 at a predetermined position (refer to FIG. 14B). Then, the work vehicle 10 travels straight in the backward direction on the headland work route r4, and lowers the work machine 14 to switch to the forward direction when reaching a boundary of the worked region B1, and resumes work while traveling straight on the headland work route r4.

According to the above-mentioned turning method, as shown in FIG. 14B, the work vehicle 10 does not step into the worked region B1 upon turning, and therefore, the work results can be kept in a good condition.

As another embodiment of the present invention, in a case of generating a turning route in the headland region Fb, the operation control unit 21 generates the first turning route Rb1 until it is no longer possible to generate the first turning route Rb1, and in a case where it is no longer possible to generate the first turning route Rb1, it may be possible to inquire of an operator whether or not to generate the second turning route Rb2. The operation control unit 21 may display a selection screen (refer to FIG. 7) for selecting "prioritize work area" or "prioritize work result" as the inquiry, or may display a selection screen for selecting whether or not to permit generation of the second turning route Rb2. The operation control unit 21 generates a turning route on the basis of the operator's response to the inquiry. In this configuration, the operation control unit 21 also decides a turning mode of the turning route on which the work vehicle 10 is caused to turn and travel in the headland region Fb on the basis of the operator's selection operation.

It is noted that the operation control unit 21 may include in the inquiry information on an advantage (work area can be maximized) and a disadvantage (the work vehicle 10 tramples the worked region B1 upon turning) in a case where the second turning route Rb2 is generated.

A plurality of selection modes of the present invention are not limited to two selection modes of the work area priority mode and the work result priority mode, but may further include other selection modes. For example, the plurality of selection modes may include a selection mode in which a turning route in the headland region Fb consists only of the second turning route Rb2 (refer to FIG. 5E). In the automatic traveling system 1 according to this embodiment, the plurality of selection modes include at least either one of a selection mode for prioritizing an area where the work vehicle can work by automatic traveling (the work area priority mode) or a selection mode for prioritizing work results made by the work vehicle (the work result priority mode). The work area priority mode for prioritizing the area that can be worked ((work area can be maximized) by automatic traveling corresponds to the first selection mode of the present invention, and the work result priority mode for prioritizing the work results corresponds to the second selection mode of the present invention.

The operation terminal 20 according to the present embodiments may be mounted on the work vehicle 10 or may be located outside the work vehicle 10. Each processing unit of the operation terminal 20 may be included in the vehicle control device 11 of the work vehicle 10. That is to say, in the above-mentioned embodiments, the operation terminal 20 corresponds to a route generation system according to the present invention, and the route generation system according to the present invention may be composed solely of the work vehicle 10. In addition, the route generation system according to the present invention may be configured including the work vehicle 10 and the operation terminal 20. Furthermore, each processing unit of the operation terminal 20 may be included in a server that can communicate with the work vehicle 10.

REFERENCE SIGNS LIST

1: automatic traveling system
10: work vehicle
14: work machine
16: positioning device
20: operation terminal
21: operation control unit
211: setting processing section
212: reception processing section
213 generation processing section (first to third generation processing sections)
214: determination processing section
215: decision processing section
F: field
Fa: inner region
Fb: headland region
R: target route
Ra: inner work route
Rb: headland work route
Rb1: first turning route
Rb2: second turning route
C1: stepping region

The invention claimed is:

1. A route generation method, comprising:
causing a work vehicle to travel on a generated work route in an inner region of a field;
causing the work vehicle to travel on a generated headland work route in a headland region around the inner region in the field; and
causing the work vehicle to turn and travel on a turning mode of a turning route in the headland region on the basis of a selection operation, wherein the turning route for the turning mode is generated on the basis of the selection operation in the headland region, and the turning route is generated based on prioritizing either work area or work result, wherein prioritizing the work area increases an area for automatic travel, whereas prioritizing the work result increases a turning region to restrict a work region from further being trampled.

2. The route generation method according to claim 1, wherein
the turning mode includes a first turning mode for turning backward after traveling forward and a second turning mode for turning forward after traveling backward.

3. The route generation method according to claim 2 including the plurality of selection modes for generating the turning route; wherein
the turning route that includes a first turning route for the first turning mode and a second turning route for the second turning mode is generated in case where a first selection mode is selected, and the turning route that includes the first turning route but that does not include the second turning route is generated in a case where a second selection mode is selected.

4. The route generation method according to claim 3, wherein
in a case where the first selection mode is selected, the first turning route is generated on the inner region side of the headland region, and the second turning route is generated on an outer peripheral side of the headland region.

5. The route generation method according to claim 4, wherein
in a case where the first selection mode is selected, the first turning route is generated until it is no longer possible to generate the first turning route from the inner region side toward the outer peripheral side of the headland, and the second turning route is generated in a case where it is no longer possible to generate the first turning route.

6. The route generation method according to claim 3, wherein
in a case where the second selection mode is selected, the first turning route is generated on the inner region side of the headland region, and the second turning route is not generated in the headland region.

7. The route generation method according to claim 6, wherein
in a case where the second selection mode is selected, the first turning route is generated until it is no longer possible to generate the first turning route from the inner region side toward the outer peripheral side of the headland region, and generation processing of the turning route is terminated in a case where it is no longer possible to generate the first turning route.

8. The route generation method according to claim 3, wherein
the plurality of selection modes include at least either one of a selection mode for prioritizing an area where the work vehicle can work by automatic traveling or a selection mode for prioritizing work results made by the work vehicle.

9. The route generation method according to claim 8, wherein
the first selection mode is a selection mode for prioritizing an area where the work vehicle can work by automatic traveling, and the second selection mode is a selection mode for prioritizing work results made by the work vehicle.

10. A route generation system, comprising:

a first generation processor that generates an inner work route in an inner region of a field on which a work vehicle is caused to travel;

a second generation processor that generates a headland work route in a headland region around the inner region of the field on which the work vehicle is caused to travel;

a decision processor that decides a turning route for a turning mode in the headland region, on which the work vehicle is caused to turn and travel on the basis of a selection operation;

where the turning route for the turning mode is generated on the basis of the selection operation in the headland region, and the turning route is generated based on prioritizing either work area or work result, wherein prioritizing the work area increases an area for automatic travel, whereas prioritizing the work result increases a turning region to restrict a work region from further being trampled.

11. A computer-readable non-transitory medium that stores a route generation program for causing one or a plurality of processors to perform, comprising:

causing a work vehicle to travel on a generated work route in an inner region of a field;

causing the work vehicle to travel on a generated headland route in a headland region around the inner region in the field; and causing the work vehicle to turn and travel on a selected turning mode of a turning route in the headland region on the basis of a selection operation, wherein the turning route for the turning mode is generated on the basis of the selection operation in the headland region, and the turning route is generated based on prioritizing either work area or work result, wherein prioritizing the work area increases an area for automatic travel, whereas prioritizing the work result increases a turning region to restrict a work region from further being trampled.

* * * * *